US011190365B2

(12) United States Patent
Lu

(10) Patent No.: US 11,190,365 B2
(45) Date of Patent: Nov. 30, 2021

(54) METHOD AND APPARATUS FOR PUF GENERATOR CHARACTERIZATION

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 134 days.

(21) Appl. No.: 16/216,824

(22) Filed: Dec. 11, 2018

(65) Prior Publication Data

US 2020/0044871 A1    Feb. 6, 2020

Related U.S. Application Data

(60) Provisional application No. 62/712,365, filed on Jul. 31, 2018.

(51) Int. Cl.
| | |
|---|---|
| *H04L 9/32* | (2006.01) |
| *G11C 11/4094* | (2006.01) |
| *G01R 31/3187* | (2006.01) |
| *H04L 9/06* | (2006.01) |
| *G11C 11/419* | (2006.01) |

(52) U.S. Cl.
CPC ........ *H04L 9/3278* (2013.01); *G01R 31/3187* (2013.01); *G11C 11/4094* (2013.01); *G11C 11/419* (2013.01); *H04L 9/0618* (2013.01)

(58) Field of Classification Search
CPC . H04L 9/3278; H04L 9/0618; G11C 11/4094; G11C 11/419; G11C 11/4076; G11C 11/4078; G11C 11/417; G11C 29/12; G11C 29/50; G11C 2029/4402; G11C 2029/5002; G11C 7/1036; G11C 7/12; G11C 7/24; G01R 31/3187
See application file for complete search history.

(56) References Cited

U.S. PATENT DOCUMENTS

| | | | |
|---|---|---|---|
| 9,279,850 B1* | 3/2016 | Pedersen | H03K 19/003 |
| 2013/0022203 A1* | 1/2013 | Stewart | G06F 7/584 |
| | | | 380/278 |
| 2017/0111180 A1* | 4/2017 | Mathew | H04L 9/3278 |
| 2017/0180140 A1* | 6/2017 | Mai | G06F 21/72 |

\* cited by examiner

*Primary Examiner* — April Y Blair
*Assistant Examiner* — Rong Tang
(74) *Attorney, Agent, or Firm* — Duane Morris LLP

(57) ABSTRACT

Disclosed is a physical unclonable function generator circuit and testing method. In one embodiment, a physical unclonable function (PUF) generator, includes: a PUF cell array comprising a plurality of bit cells configured in at least one column and at least one row, wherein the plurality of bit cells each provides two voltage transient behaviors on two corresponding bit lines of the at least one column; and at least two load control circuits coupled to the two bit lines of the at least one corresponding column, wherein the at least two load control circuits are each configured to provide at least one discharge pathway to at least one of the two corresponding bit lines, wherein the at least one discharge pathway is configured to change at least one of the two voltage transient behaviors so as to determine stability of each of the plurality of bit cells of the PUF cell array.

20 Claims, 16 Drawing Sheets

METHOD AND APPARATUS FOR PUF GENERATOR CHARACTERIZATION

This application claims benefit of and priority to U.S. Provisional Patent Application No. 62/712,365, entitled METHOD FOR IDENTIFYING RELIABLE PUF CELLS, filed Jul. 31, 2018, the contents of which is hereby incorporated by reference as if set forth in their entirety.

BACKGROUND

A physically unclonable function (PUF) generator is a physical structure generally within an integrated circuit that provides a number of corresponding outputs (e.g., responses) in response to inputs (e.g., challenges/requests) to the PUF generator. A unique identity of the integrated circuit may be established by such challenge-response pairs provided by the PUF generator. With the establishment of the identity, secure communication can be guaranteed. The PUF generator can also be used for existing authentication purposes to replace the current method of assigning an identity to an electronic device. Since the PUF generator is based on intrinsic properties of a manufacturing process, the PUF has various advantages over conventional authentication approaches that inscribes an identity on a device which may be mimicked and/or reverse engineered more easily.

For quality-control purposes, testing of functionalities of PUF generators after manufacturing is required to determine qualified PUF generators and categorize qualified PUF generators according to their repeatability and uniqueness. There exists a need to develop a method to characterize PUF generators for quality-control purposes at high speed and at low cost in order to identify defective PUF generators, to categorize qualified PUF generators, and to provide insights of the manufacturing processes.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1:
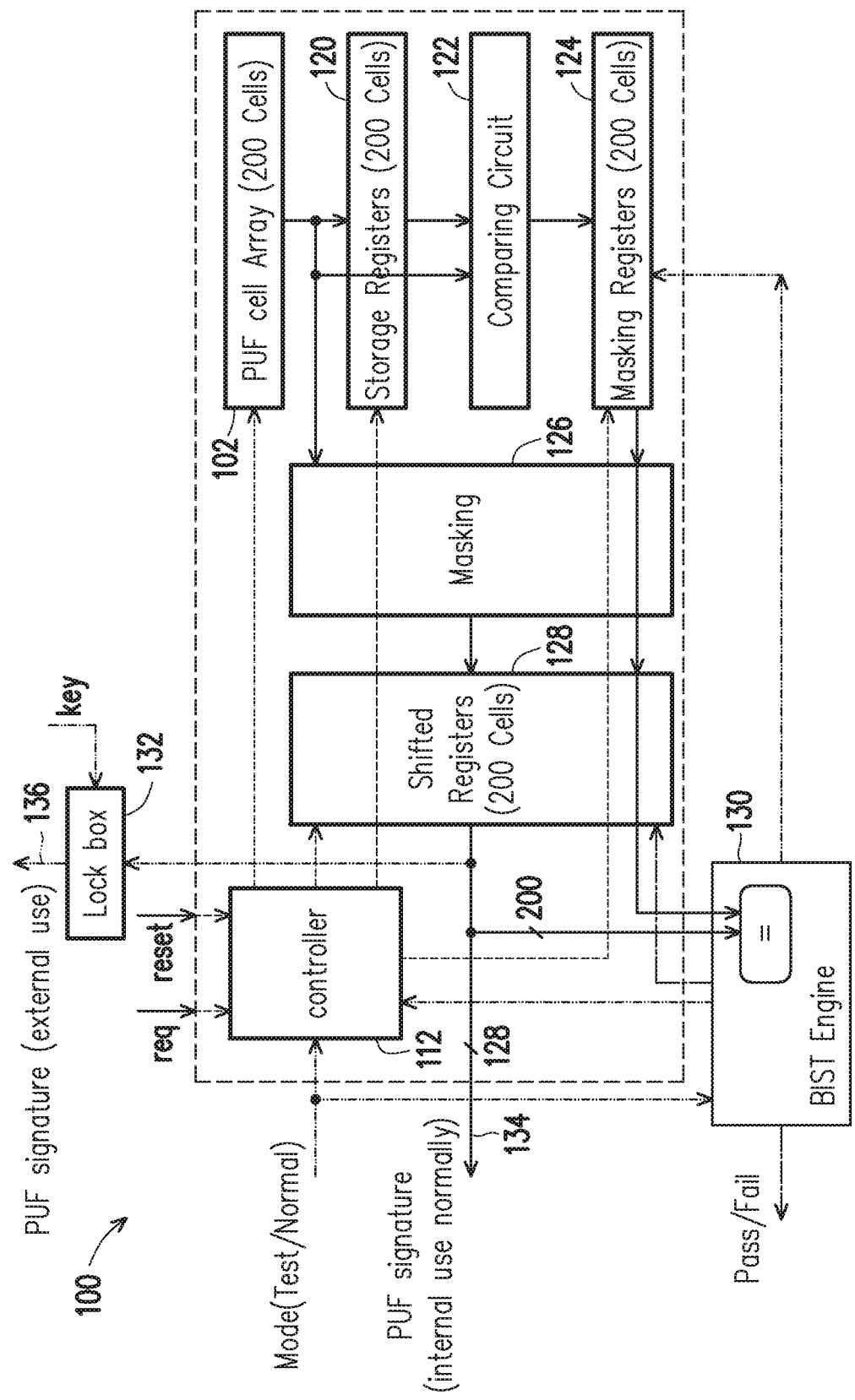
FIG. 1 illustrates an exemplary block diagram of a PUF generator, in accordance with some embodiments of present disclosure.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

It is understood that even though each of the bit cells in a PUF cell array and even each of the devices within the same bit cell are manufactured using the same process, one or more manufacturing variabilities may still cause each bit cell of the SRAM device to be unique and one of its uniqueness is intrinsically tend to be at a high state (i.e., a logic "1") or at a low state (i.e., a logic "0") while the bit cell is accessed. In other words, each bit cell may have an intrinsic tendency to present either a logic "1" or a logic "0", and moreover, some bit cells may have a strong intrinsic tendency and some bit cells may have a weak intrinsic tendency. Intrinsic tendencies of each bit cell can be different, which are caused by variations in parameters through a fundamentally non-uniform manufacturing process. This intrinsic tendency may be used to determine whether such a bit cell is suitable (i.e., strong tendency to generate a logical state either "1" or "0") to provide a reliable PUF signature. When a bit cell has a strong intrinsic tendency, the bit cell may remain at its "preferred" logical state for a longer time or transition to its "preferred" logical state very quickly and/or at a statistically higher frequency when the memory-based PUF generator is accessed. In some embodiments, such a bit cell may be referred to as a "stable bit cell". When a bit cell has a weak intrinsic tendency, the bit cell does not have a "preferred" logical state. That is, the bit cell with weak intrinsic tendency may sometimes present (e.g., remain at or transition to) a high state and sometimes present (e.g., remain at or transition to) a low state without statistic preference when the memory-based PUF generator is accessed. In some embodiments, such a bit cell may be referred to as an "unstable bit cell". An ideal PUF generator comprises no unstable bit cells. Further, a PUF generator should give a repeatable response every time it is challenged. That is, the Intra-Humming Distance (HD) of responses, which is used to describe the repeatability of a PUF generator, should be as close to 0 as possible. Intra-HD of 0 indicates the PUF generator is perfectly repeatable. At the same time, PUF generators and their responses should be as different as possible. Thus, the Inter-HD of responses, which is used to describe the uniqueness of a PUF generator, should be as close to 50% as possible. If Inter-HD of all responses are 50% then each PUF generator is unique. This disclosure presents various embodiments of a quality control testing method and apparatus for PUF generators.

FIG. 1 illustrates an exemplary block diagram of a PUF generator 100, in accordance with some embodiments of present disclosure. It is noted that the PUF generator 100 is merely an example, and is not intended to limit the present disclosure. Accordingly, it is understood that additional functional blocks may be provided in or coupled to the PUF generator 100 of FIG. 1, and that some other functional blocks may only be briefly described herein.

In the illustrated embodiment of FIG. 1, the PUF generator 100 comprises a PUF cell array 102, which comprises a plurality of bit cells. The plurality of bit cells are arranged in a column-row configuration in which each column has a bit line (BL) and a bit line bar (BLB), each row has a word line (WL). More specifically, the BL and BLB of each column are respectively coupled to a plurality of bit cells that are disposed in that column, and each memory cell in that column is arranged on a different row and coupled to a respective (different) WL. That is, each bit cell of the PUF cell array 102 is coupled to a BL of a column of the PUF cell array 102, a BLB of the column of the PUF cell array 102, and a WL of a row of the PUF cell array 102. In some embodiments, the BL's and BLB's are arranged in parallel vertically and the WL's are arranged in parallel horizontally (i.e., perpendicular to the BL's and BLB's). In some embodiments, WL for each row of bit cells in the PUF cell array 102 are connected together. In some embodiments, as discussed in further detail in FIGS. 2 and 4, the PUF cell array 102 can further includes a BL/BLB pre-charge line (BPC), a load line for BL and a load line for BLB for each column of bit cells. An illustrated embodiment of the PUF cell array 102 will be provided in further detail below with reference to FIG. 2. In one illustrated embodiment, each of the bit cells of the PUF cell array 102 comprises at least one transistor, which will be described in further detail below in FIG. 3.

In the illustrated embodiment as shown in FIG. 1, the PUF generator 100 further comprises a storage register 120, a comparing circuit 122, a mask register 124, a masking circuit 126, and a shifted register 128. In some embodiments, the comparing circuit 122 is a XOR gate (exclusive gate), which only outputs a logic 0, when all the inputs are equal. As described above, in some embodiments, the controller 112 is coupled to the PUF cell array 102, storage registers 120, masking registers 124 and shifted registers 128, which are configured to control the coupled components. In the illustrated embodiments, the PUF cell array 102 is coupled to the storage registers 120, the comparing circuit 122, and the masking circuit 126 directly. In some embodiments, the comparing circuit is coupled to the masking registers 124, which is further coupled to the masking circuit 126 and the shifted registers 128. In some embodiments, the shifted registers 128 comprises a cascade of flip flops. In some embodiments, the shift registers 128 comprises at least the same number of cells as PUF cells. The shift registers 128 are used to select the PUF cells used to generate the PUF signature bits based on only strongly biased PUF cells for signature generation. In some embodiments, at the shift registers 128 select the bits that are not marked in the masking map (masking map). In some embodiments, the shift registers 128 performs the filtering by only shifting out the first n bits that are needed for a PUF signature. In some embodiments, it may filter the bits by looking at the last n strongly biased bits, wherein n is the number of bits needed for signature. In some embodiments, we can mark any numbers of bits due to aging, as long as there is enough PUF bits that can continue to function.

The controller 112 configured to receive a request/challenge (e.g., a request to power on the coupled PUF cell array 102, a request to access the PUF signature of the PUF cell array 102, etc.). In some embodiments, the controller 112 is also configured to receive a test/normal mode input (e.g., switch between different operational modes). In some embodiments, the controller 112 is configured to transmit a response based on the logical states of the bit cells of the PUF cell array 102 (e.g., a PUF output) to the masking 126 or the copy array 120 in response to the request. The controller 112 is configured to control (e.g., increase or decrease) a voltage level of a supply voltage applied at each of the bit cells, control (e.g., increase or decrease) a voltage level applied at each of the WL and the WLB. In some embodiments, the controller 112 may enable the voltage supply to at least one selected column and at least one selected row. Further, the controller 112 may switch between the evaluation mode and the normal operation mode. The controller 112 may also introduce external capacitance loads to BLs and BLBs of each column of the PUF cell array for evaluating the stability of each bit cell. In some embodiments, such external capacitance loads is configured by the controller 112 to change the charging/discharging rate on the corresponding BL or BLB by using capacitors with different capacitance values. These capacitance loads are used to expedite the identification of unstable bit cells which do not provide constant logical states so as to create a masking map.

In some embodiments, the controller 112 also comprises a finite state machine (FSM). In some embodiments, the FSM in the controller 112 comprises a plurality of dynamic flip-flop circuits (DFF), a population counter (Popcount), and an evaluation logic circuit. In some embodiments, the controller 112 may control a periodic reading of logical states of the bit cells. These are described in further detail below with respect to FIG. 4. In some alternative embodiments, the controller 112 may be implemented as a separate block, which is not embedded in the PUF cell array 102. In some embodiments, the controller 112 can be embedded in the PUF cell array 102.

In some embodiments, the controller 112 is a representative device and may comprise a processor, a memory, an input/output interface, a communications interface, and a system bus. The processor may comprise any processing circuitry operative to control the operations and performance of the controller 112 of the PUF generator 100. In various aspects, the processor may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor also may be implemented by a controller, a microcontroller, an application specific integrated circuit (ASIC), a field programmable gate array (FPGA), a programmable logic device (PLD), and so forth.

In various aspects, the processor may be arranged to run an operating system (OS) and various applications. Examples of an OS comprise, for example, operating systems generally known under the trade name of Apple OS, Microsoft Windows OS, Android OS, and any other proprietary or open source OS.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in the memory.

In some embodiments, the memory may comprise any machine-readable or computer-readable media capable of storing data, including both volatile/non-volatile memory and removable/non-removable memory. The memory may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the controller 112 of the system 100.

For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory may contain an instruction set, in the form of a file for executing a method of generating one or more timing libraries as described herein. The instruction set may be stored in any acceptable form of machine-readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processor.

In some embodiments, the I/O interface may comprise any suitable mechanism or component to at least enable a user to provide input (i.e., test/request and or test/normal modes, etc.) to the controller 112 of the PUF generator 100 and the controller 112 to provide output control to the other components of the PUF generator 100 (e.g., PUF cell array 102, shifted registers 128, storage registers 120, etc.).

In some embodiments, the PUF generator 100 further comprises a BIST (Built-in Self-Test) engine 130 and a lock box 132. The BIST engine 130 allows the PUF generator 100 to tests its functionality after manufacturing for quality control in a cost effective fashion and at a low complexity. In some embodiments, the BIST engine 130 is automated receiving testing instructions through the controller 112. In some embodiments, the BIST engine 130 is also coupled to the controller 112, shifted registers 128 and masking registers 124 to provide feedback based on the test results, for example number of critical bit cells and number of stable bit cells, etc., which are discussed in further detail in FIG. 13. In some embodiments, the PUF output can be transmitted through a first port 134 for internal uses. In certain embodiments, the PUF output can be encrypted by a public key in the lock box 132 and transmitted to a server through a second port 136 for external uses.

During testing, an initial PUF output from the plurality of bit cells of the PUF cell array 102 is generated, it is first stored in the storage registers 120. In some embodiments, the storage registers 120 can be implemented with any type of on-chip memory design, including on-chip SRAMs. In some embodiments, the storage register 120 comprises on-chip memory array that contains the same number of bits as the number of bit cells in the PUF cell array 102 of the PUF generator 100. For example, if the PUF cell array comprises 200 bit cells, the storage registers 120 comprise 200 bits (or cells). During an evaluation process, a second PUF output from the bit cells of the PUF cell array 102 is generated either by changing operational conditions (i.e., temperature and operational voltage) or by adding a load to each of the BL/BLB in the PUF cell array 102. The second PUF output is then compared to the initial PUF output in a compare circuit 122 (i.e., a XOR gate). Unstable bit cells with different logical states in the two PUF outputs during the evaluation process are then identified and their addresses are stored in masking registers 124. This evaluation process repeats to acquire multiple PUF outputs during multiple iterations under the same or different stressed operation conditions (e.g., noises, temperature, voltage, etc.). The masking map comprising a map of stable and unstable bit cells identified by introducing noises to the plurality of bit cells in the PUF cell array 102 and the golden map comprising a map of stable and unstable bit cells identified by changing operation conditions to the plurality of bit cells in the PUF cell array 102 can be obtained and compared in the BIST engine 130. Faulty PUF generators are then discarded and PUF generators that pass the test is then used to generate a PUF signature.

During a normal operation to generate a PUF signature using a device that passes the afore-described test, the controller 112 switches from the testing mode to the normal operation mode. In some embodiments, the masking registers 124 are then directly coupled to the masking 126 and the shifted registers 128, which selects stable bit cells that are not marked by the masking registers 124 from a PUF output directly from the PUF cell array 102 and their logical states as the PUF signature. In some embodiments, the PUF signature can be transmitted through the first port 134 for internal uses or through the second port 136 after encrypted in the lock box 132 for external uses. In some embodiments, the PUF signature comprises an N-bit response and the initial PUF signature comprises an M-bit response, wherein N≤M, N and M are positive integers. For example, referring to FIG. 1 again, there are 200 bit cells in the PUF cell array 102 and 128 bit cells identified during testing are stable and used for generating the PUF signature.

Figure 2A:
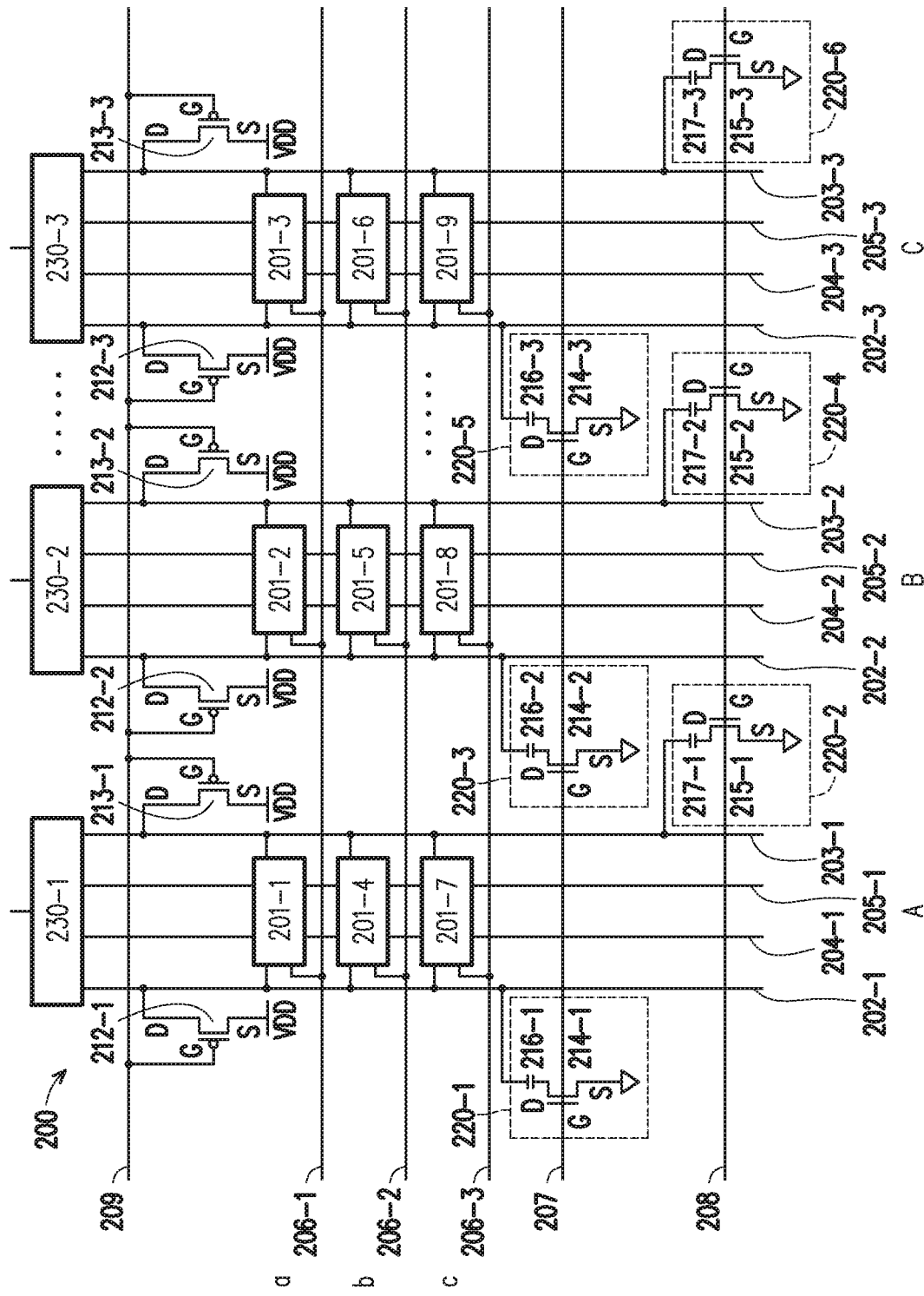
FIG. 2A illustrates an exemplary circuit diagram of a PUF cell array comprising a plurality of bit cells, in accordance with some embodiments of present disclosure.

FIG. 2A illustrates an exemplary circuit diagram of a PUF cell array 102 comprising a plurality of bit cells, in accordance with some embodiments of present disclosure. In some embodiments, the PUF cell array 102 includes a plurality of bit cells 201-1, 201-2, 201-3, 201-4, 201-5, 201-6, 201-7, 201-8, and up to 201-9. Although only 9 bit cells are shown, any desired number of bit cells may be included in the PUF cell array 102 while remaining within the scope of the present disclosure. As described above, the bit cells 201-1, 201-2, 201-3, 201-4, 201-5, 201-6, 201-7, 201-8, and 201-9 are arranged in a column-row configuration. More specifically, in some embodiments, the PUF cell array 102 includes bit lines (BL's) 202-1, 202-2, and 202-3 arranged in parallel, bit line bars (BLB's) 203-1, 203-2, and 203-3 also arranged in parallel, and word lines (WL's) 206-1, 206-2, and 206-3. The WL's 206 are arranged in parallel orthogonally to the BL's 202 and BLB's 203. In some embodiments, the PUF cell array 102 also includes positive supply voltage power (bit voltage) 204-1, 204-2, and 204-3, and GND (zero voltage) 205-1, 205-2 and 205-3. As such, the PUF cell array 102 may include a first plurality of columns (e.g., arranged vertically), a second plurality of rows (e.g., arranged horizontally), wherein each column includes a respective pair of BL 202, BLB 203, VDD204, GND 205, and each row includes a respective WL 206. Further, the PUF cell array 102 may also include a BL/BLB pre-charge line (BPC) 209, which is used to charge or discharge the BL's 202 and BLB's 203 of the PUF cell array 102 so as to reset each bit cell.

For example, as shown in the illustrated embodiment of FIG. 2A, the PUF cell array 102 includes columns "A," "B," and "C," and rows "a," "b," and "c," wherein column A includes respective BL 202-1, BLB 203-1, VDD204-1 and GND 205-1; column B includes respective BL 202-2, BLB 203-2, VDD204-2 and GND 205-2; column C includes respective BL 202-3, BLB 203-3, VDD204-3 and GND 205-3; row a includes a respective WL 206-1; row b includes a respective WL 206-2; and row c includes a respective WL 206-3.

Moreover, each column includes one or more bit cells that are each coupled to the column's respective BL and BLB, a different separate WL. For example, column A includes bit cells 200-1, 200-4, and 200-7, wherein the bit cells 200-1, 200-4, and 200-7 are each coupled to the BL 202-1, BLB 203-1, VDD204-1, GND 205-1, WL's 206-1, 206-2, and 206-3, respectively; column B includes bit cells 200-2, 200-5, and 200-8, wherein the bit cells 200-2, 200-5, and 200-8 are each coupled to the BL 202-2, BLB 203-2, VDD204-2, GND 205-2, WL's 206-1, 206-2, and 206-3, respectively; and column C includes bit cells 200-3, 200-6, and 200-9, wherein the bit cells 200-3, 200-6, and 200-9 are each coupled to the BL 202-3, BLB 203-3, VDD204-3, GND 205-3, WL's 206-1, 206-2, and 206-3, respectively. BL 202 and BLB 203 of a column are coupled to a corresponding sense amplifier enable (SAEN) timing circuit 230. Specifically, BL/BLB 202-1/203-1 are coupled to a first SAEN timing circuit 230-1 of column A; BL/BLB 202-2/203-2 are coupled to a second SAEN timing circuit 230-2 column B; and BL/BLB 202-3/203-3 are coupled to a third SAEN timing circuit 230-3 of column C. In some embodiments, the SAEN timing circuit 230 comprises a sensing amplifier and a corresponding SAEN generator, which are discussed further in detail below in FIG. 2C.

In the illustrated embodiment, the BPC 209 is coupled to BL/BLB 202/203 of each column through a pre-charge transistor 212/213; respectively. Specifically, the BPC 209 is coupled to BL 202-1 through a first PC transistor 212-1 of column A, wherein drain terminal of the first PC transistor 212-1 is coupled to the BL 202-1, gate terminal of the first PC transistor 212-1 coupled to the BPC 209, and source terminal of the first PC transistor 212-1 is coupled to VDD(VDD); the BPC 209 is coupled to BLB 203-1 through a second PC transistor 213-1, wherein drain terminal of the second PC transistor 213-1 is coupled to the BLB 203-1, gate terminal of the second PC transistor 213-1 is coupled to the BPC 209 and source terminal of the second PC transistor 213-1 is coupled to the VDD(VDD); the BPC 209 is coupled to BL 202-2 through a first PC transistor 212-2 of column B, wherein drain terminal of the first PC transistor 212-2 of column B is coupled to the BL 202-2, gate terminal of the first PC transistor 212-2 of column B is coupled to the BPC 209, and source terminal of the first PC transistor 212-2 of column B is coupled to VDD(VDD); the BPC 209 is coupled to BLB 203-2 through a second PC transistor 213-2 of column B, wherein drain terminal of the second PC transistor 213-2 of column B is coupled to the BLB 203-2, gate terminal of the second PC transistor 213-2 is coupled to the BPC 209, and source terminal of the second PC transistor 213-2 of column B is coupled to the VDD(VDD); the BPC 209 is coupled to BL 202-3 through a first PC transistor 212-3 of column C, wherein drain terminal of the first PC transistor 212-3 of column C is coupled to the BL 202-3, gate terminal of the first PC transistor 212-3 of column C is coupled to the BPC 209, and source terminal of the first PC transistor 212-3 of column C is coupled to VDD(VDD); and the BPC 209 is coupled to BLB 203-3 through a second PC transistor 213-3 of column C, wherein drain terminal of the second PC transistor 213-3 of column C is coupled to the BLB 203-3, gate terminal of the second PC transistor 213-3 of column C is coupled to the BPC 209 and source terminal of the second PC transistor 213-3 of column C is coupled to the VDD(VDD).

In some embodiments, a first load line 207 and a second load line 208 are coupled to the BLs 202 and BLBs 203 through a corresponding a load control circuit 220. In some embodiments, the load control circuit 220 comprises at least one capacitor and at least one transistor for each bit-line (BL 202 or BLB 203), e.g., a first load control circuit 220-1 and a second load control circuit 220-2 for the BL 202-1 and BLB 203-1 of column A, respectively; a third load control circuit 220-3 and a fourth load control circuit 220-4 for the BL 202-2 and BLB 203-2 of column B, respectively; and a fifth load control circuit 220-5 and a sixth load control circuit 220-6 for the BL 202-3 and BLB 203-3 of column C, respectively. In some other embodiments, the load control circuit can comprise a plurality of capacitors and a plurality of transistors, which are discussed in further detail in FIG. 2B below.

Referring back to FIG. 2A again, in the illustrated embodiment, the first load line 207 is coupled to the BL's 202 through first corresponding load capacitors 216 and serially connected corresponding load line enable transistors 214. Specifically, drain terminal of the load line enable transistor 214-1 is coupled with one terminal of the capacitor load 216-1 and the other terminal of the capacitor load 216-1 is coupled to the BL 202-1. Source terminal of the load line enable transistor 214-1 is coupled to GND and gate terminal of the load line enable transistor 214-1 is coupled to the first load line 207. Similarly, drain terminal of the load line enable transistor 214-2 is coupled with one terminal of the capacitor load 216-2 and the other terminal of the capacitor load 216-2 is coupled to the BL 202-2. Source terminal of the load line enable transistor 214-2 is coupled to GND and gate terminal of the load line enable transistor 214-2 is coupled to the first load line 207. Further, drain terminal of the load line enable transistor 214-3 is coupled with one terminal of the capacitor load 216-3 and the other terminal of the capacitor load 216-3 is coupled to the BL 202-3. Source terminal of the load line enable transistor 214-3 is coupled to GND and gate terminal of the load line enable transistor 214-3 is coupled to the first load line 207.

In the illustrated embodiment, a second load line 208 is coupled to the BLB's 203 through corresponding load capacitors 217 and serially connected corresponding load line enable transistors 215. Specifically, drain terminal of the load line enable transistor 215-1 is coupled with one terminal of the capacitor load 217-1 and the other terminal of the capacitor load 217-1 is coupled to the BLB 203-1. Source terminal of the load line enable transistor 215-1 is coupled to GND and gate terminal of the load line enable transistor 215-1 is coupled to the second load line 208. Similarly, drain terminal of the load line enable transistor 215-2 is coupled with one terminal of the capacitor load 217-2 and the other terminal of the capacitor load 217-2 is coupled to the BLB 203-2. Source terminal of the load line enable transistor 215-2 is coupled to GND and gate terminal of the load line enable transistor 215-2 is coupled to the second load line 208. Further, drain terminal of the load line enable transistor 215-3 is coupled with one terminal of the capacitor load 217-3 and the other terminal of the capacitor load 217-3 is coupled to the BLB 203-3. Source terminal of the load line enable transistor 215-3 is coupled to GND and gate terminal of the load line enable transistor 215-3 is coupled to the second load line 208.

In some embodiments, the transistor 212-1, 212-2, 212-3, 213-1, 213-2 and 213-3 each comprises a PMOS transistor and the transistors 214-1, 214-2, 214-3, 215-1, 215-2, and 215-3 each comprises an NMOS transistor. In some embodiments, the load capacitors 216-1, 216-2, 216-3, 217-1, 217-2, and 217-3 can be MOS capacitors by connecting source and drain terminals together.

As described above, each bit cell of the PUF cell array 102 (e.g., 201-1, 200-2, 201-3, 201-4, 200-5, 201-6, 200-7, 201-8, 201-9, etc.) may include a plurality of transistors (e.g., 2 transistors). In some embodiments, a logical state stored in each bit cell may be written to the bit cell by applying either a high state (i.e., a logical "1") or a low state (i.e., a logical "0") through a corresponding BL, BLB, and WL. In some embodiments, a stable logical state of a bit cell can be achieved after stabilizing from a metastable logical state due to intrinsic differences in the bit cell (e.g., intrinsic differences in current leakage rates in DRAM based bit cells). It should be also noted that FIG. 2 is only an example for illustration purposes and is not intended to be limiting. The type of signal lines in a PUF cell array 102 in this present disclosure can be arranged in different ways depending on the circuit layout design and types of bit cells used in the array.

Figure 2B:
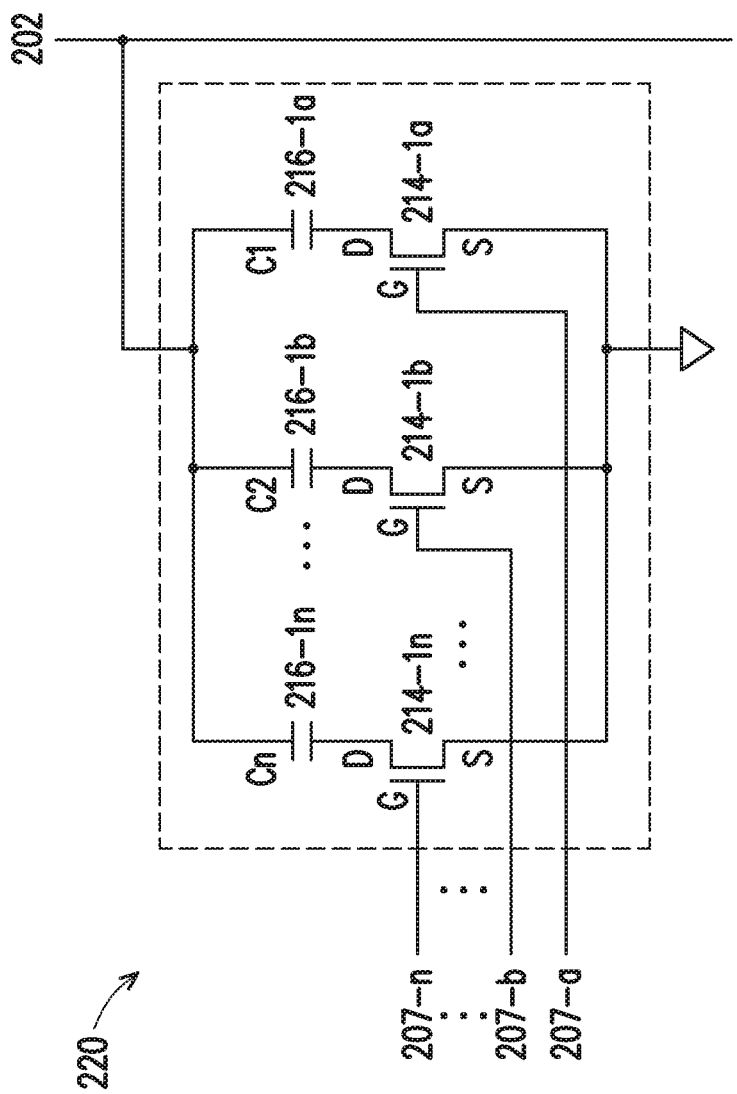
FIG. 2B illustrates an exemplary circuit diagram of a load control circuit, in accordance with some embodiments of the present disclosure.

FIG. 2B illustrates an exemplary circuit diagram of a load control circuit 220, in accordance with some embodiments of the present disclosure. In the illustrated embodiments, the load control circuit 220 is coupled between a first load line 207 and the corresponding BL 202. It should be noted the load control circuit 220 can be coupled between a second load line 208 and the corresponding BLB 203.

In the illustrated embodiment, the load control circuit 220 comprises 3 load capacitors C1 216-1a, C2 216-1b, and Cn 216-1n, and 3 corresponding load line enable transistors 214-1a, 214-1b, and 214-1n, in which n is a non-negative integer. In the illustrated embodiments, one of the terminals of a load capacitor 216 is coupled to drain terminal of the corresponding load line enable transistor 214, and the other terminal of the load capacitor 216 is coupled to the BL 202. Source terminal of the corresponding load line enable transistor 214 is coupled to GND and gate terminal of the corresponding load line enable transistor 214 is coupled to the first load line 207. In some embodiments, capacitance values of the 3 load capacitors C1 216-1a, C2 216-1b, and Cn 216-1n are different. In some embodiments, the capacitance values of the 3 load capacitors C1 216-1a, C2 216-1b, and Cn 216-1n are determined by the size (e.g., area) of the load capacitors. In some embodiments, each of the 3 load line enable transistors 214 can be individually controlled by the corresponding first load line 207 so as to apply different load capacitors to the BL 202 and change the original charging/discharging rate of the BL 202.

During operation, when a voltage level on the BL 202 charges from low to high or discharges from high to low, a load capacitor can be added to the BL 202 by turning on the corresponding load line enable transistor 214 by pulling up the voltage on the first load line 207. When a load capacitor 216 is added to the circuit, it provides a discharge pathway which can slow down the change of the voltage level on the BL 202.

Figure 2C:
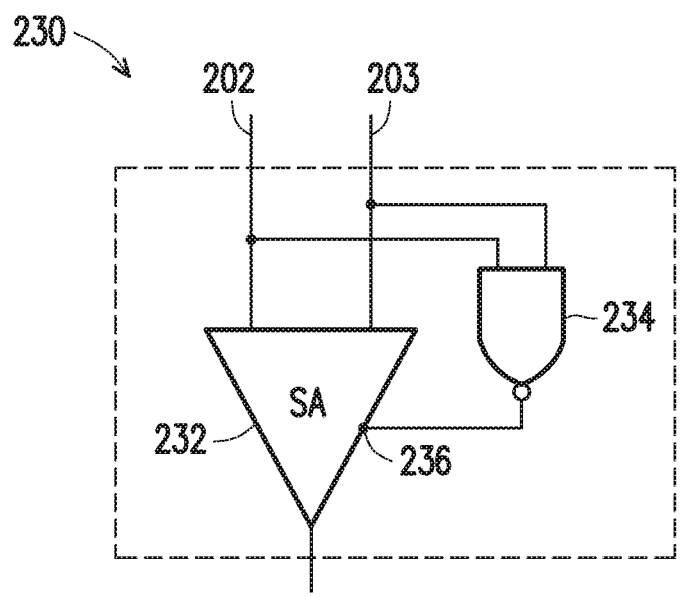
FIG. 2C illustrates an exemplary circuit diagram of a sense amplifier enable (SAEN) timing circuit, in accordance with some embodiments of the present disclosure.

FIG. 2C illustrates an exemplary circuit diagram of a sense amplifier enable (SAEN) timing circuit 230, in accordance with some embodiments of the present disclosure. In the illustrated embodiments, the SAEN timing circuit 230 comprises a sense amplifier (SA) 232 and a NAND gate 234. In some embodiments, inputs of the SA 232 and the NAND gate 234 each are coupled directly to a BL 202 and a BLB 203. The output of the NAND gate 234 is then coupled to the enabling terminal 236 of the SA 232. During operation, when a voltage level on one of the BL 202 and BLB 203 drops below a trigger point, the NAND gate 234 outputs a "1" to the enabling terminal 236 so as to turn on the SA 232 in order to determine the logical state of the bit cell coupled to the BL 202 and the BLB 203 by amplifying the voltage difference between the BL 202 and BLB 203 on the inputs of the SA 232.

Figure 3:
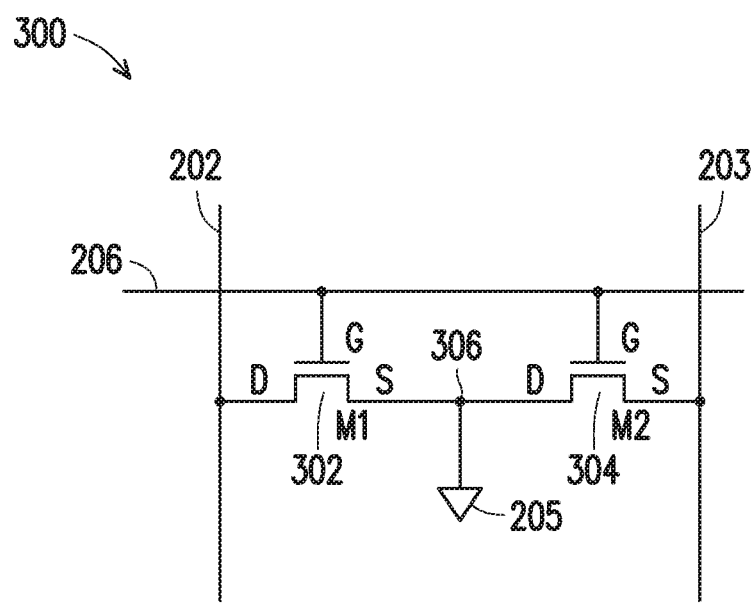
FIG. 3 illustrates an exemplary circuit diagram of a bit cell, in accordance with some embodiments of the present disclosure.

FIG. 3 illustrates an exemplary circuit diagram of a bit cell 300, in accordance with some embodiments of the present disclosure. In some embodiments, the bit cell 300 is a pre-charge bit cell and comprises 2 transistors: M1 302 and M2 304. Source terminal of the first transistor M1 302 is coupled to drain terminal of the second transistor M2 304, which are further coupled to node 306 and to GND. Drain terminal of the first transistor M1 302 and source terminal of the second transistor M2 304 are coupled to BL 202 and BLB 203, respectively. Further, gate terminals of the first and second transistors 302/304 are both coupled to a WL 206.

In some embodiments, the transistors M1 302 and M2 304 each includes an NMOS transistor. Although the illustrated embodiments of FIGS. 2A and 3 shows that transistors are either NMOS or PMOS transistors, any of a variety of transistors or devices that are suitable for use in a memory device may be implemented such as, for example, a bipolar junction transistor (BJT), a high-electron mobility transistor (HEMT), etc.

Figure 4:
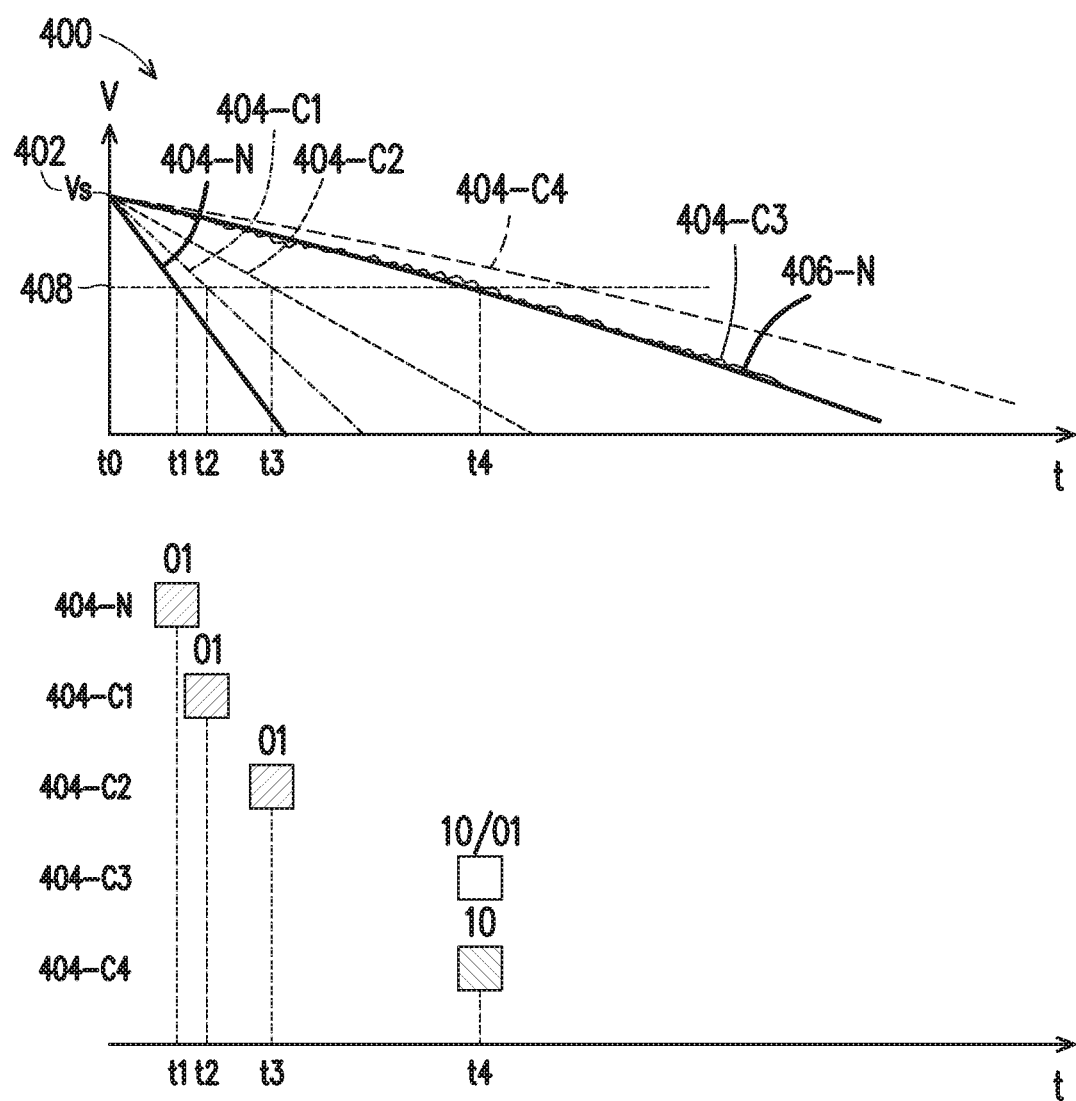
FIG. 4 illustrates exemplary signals on BL/BLB of a bit cell to determine a stability of the bit cell using load capacitors, in accordance with various embodiments of the present disclosure.

FIG. 4 illustrates exemplary signals 400 on BL 202/BLB 203 of a bit cell 300 to determine a stability of the bit cell 300 using load capacitors, in accordance with various embodiments of the present disclosure. In some embodiments, the BL 202 and BLB 203 are pulled up to a high voltage by turning on corresponding pre-charge transistors 212/213 in FIG. 2A by pulling down the voltage level on the BPC 209.

In some embodiments, initial voltages before discharging Vs 402 on the BL 202/BLB 203 are determined by the threshold voltages of the pre-charge transistors 212/213 coupled to the BL 202/BLB 203. In some embodiments, the Vs 402 on the BL 202 equals to VDD-$V_{TH212}$ and Vs 402 on the BLB 203 equals to VDD-$V_{TH213}$, wherein $V_{TH212}$ and $V_{TH213}$ are threshold voltages of the pre-charge transistors 212/213, respectively. In the illustrated embodiments, the Vs 402 on the BL 202 equals to the Vs 402 on the BLB 203.

When the BL 202 and BLB 203 are pre-charged to their corresponding Vs 402, the voltage on the BPC 209 is then pulled down to turn off the pre-charge transistors 212/213 and the access transistors M1 302 and M2 304 are then turned on by pulling up the voltage on the WL 206 at t0. Current flow through the access transistors from the BL 202/BLB 203 to GND through the dynamic node 306, resulting in a drop of voltage levels on the BL 202/BLB 203. Due to the intrinsic local variations, e.g., channel width, channel length, oxide thickness, etc., the discharge rates of voltage levels on the BL 202/BLB 203 are therefore different.

Linear transient discharge behaviors on the BL 202/BLB 203 are used to illustrate a process to test the stability of bit cells using load capacitors and a generation process of a PUF output, in accordance with various embodiments. For clarity, the numeral 404-N, 404-C1, 404-C2 and 404-C3 are used to refer to the transient discharge behaviors on BL 202 with no load capacitor, a first load capacitor C1, a second load capacitor C2, and a third load capacitor C3, respectively. Further, the numeral 406 are used to refer to the transient discharge behaviors on BLB 203 with no load capacitor. To illustrate the concept of adding load capacitors to facilitate the identification of unstable bit cells, load capacitors are only added to the BL 202. It should be noted that any numbers of load capacitors can be added to both BL 202 and BLB 203. Transient discharge behaviors 404/406 depend on the mechanisms that govern the conduction in the channel. In some embodiments, the transient discharge behavior is a function of the geometry of the transistor (channel length, gate oxide thickness, etc.), dielectric constant, threshold voltage ($V_{TH}$), initial voltage before discharging (VDD-$V_{TH}$), mobility of electrical carriers, temperature, etc. In some embodiments, the first access transistor M1 302 discharge faster than the second access transistor M2 304, resulting in two distinguishable discharge rate for the transient discharge behaviors 404-N and 406-N. In some embodiments, the transient discharge behaviors 404/406 can be exponential.

Different discharge rate in the transient discharge behaviors 404/406 on the BL 202/BLB 203 can result in different time to fully discharge and most importantly, different time to reach a trigger point 408. For clarity purposes, a constant trigger point 408 (i.e., VDD/2) is used, according to some embodiments. When the voltage levels on the BL 202 and the BLB 203 are both above the trigger point 408 (i.e., before the 404-N reaches the trigger point 408, t<t1), the NAND 232 outputs "0" on the enabling terminal 236 which disables the SA 232. When a transient discharge behavior 404-N reaches the trigger point 408 at time t1 (i.e., t1<t<t4), the NAND gate 234 outputs "1" on the enabling terminal 236, which enables the SA 232, as illustrated in FIG. 2B.

In order to evaluate the stability of bit cells so as to identify unstable bit cells in a PUF cell array, load capacitors can be added after resetting the BL 202/BLB 203 and re-charge it to their initial voltages (e.g., VDD) before discharging. In the illustrated embodiments, after turning on the load line enable transistor 214-1a, a discharge pathway through the load capacitor C1 is added to the BL 202, resulting a second discharge transient behavior (e.g., 404-C1) on the BL 202. In some embodiments, the discharge rate of the transient behavior 404-C1 is smaller than that of the 404-N and is greater than that of the 406-N. In some embodiments, when the voltage level on the BL 202 drops to a level smaller than the trigger point 408 (i.e., VDD/2) after t2, the SA reads a "0" on the BL 202 and a "1" on the BLB 203. Similarly, after turning on the load line enable transistor 214-1b, a discharge pathway through the load capacitor C2 is added to the BL 202, resulting a third discharge transient behavior (e.g., 404-C2) on the BL 202. In some embodiments, the discharge rate of the transient behavior 404-C2 is smaller than that of the 404-C1 and greater than that of the 406-N. In some embodiments, when the voltage level on the BL 202 drops to a level smaller than the trigger point 408 (i.e., VDD/2) after t3, the SA reads "0" on the BL 202 and "1" on the BLB 203.

In some embodiments, the added load capacitor can reduce the discharge rate on the BL 202 to a rate that is comparable to that on the BLB 203, in which the bit cell becomes unstable. For example, in the illustrated embodiment, a discharge pathway through the load capacitor C3 is added to the BL 202, resulting a fourth discharge transient behavior (e.g., 404-C3) on the BL 202. The discharge rate of the transient behavior 404-C3 is equal to or comparable to that of the 406-N. At time t4 when the voltage levels of both of the transient behaviors 406-N and 404-C3 drop below the trigger point 408, the SA is not able to resolve the difference between the voltage levels on the BL 202/BLB 203 and the bit cell becomes unstable with the load capacitor C3 (e.g., a "1" on BL 202 and a "0" on BLB 203). Similarly, after turning on the load line enable transistor 214, a discharge pathway through the load capacitor C4 is added to the BL 202, resulting a fifth discharge transient behavior (e.g., 404-C4) on the BL 202. In some embodiments, the discharge rate of the transient behavior 404-C4 is smaller than that of the 406-N. In some embodiments, when the voltage level on the BLB 203 drops to a level smaller than the trigger point 408 (i.e., VDD/2) after t4, the SA reads "1" on the BL 202 and "0" on the BLB 203. The polarity is changed and thus the bit cell that provides output signals to the BL 202/BLB 203 becomes unstable.

This evaluation process with different load capacitance values on the BL 202 and/or BLB 203 are repeated multiple times guided by a predetermined criterion so as to determine the stability of the bit cell 300. Through multiple iterations by changing the load capacitance values on the BL 202 and BLB 203, unstable bit cells 300 in one or more selected rows in the PUF cell array 200 can be identified and a masking map containing addresses of the unstable bit cells can be generated.

Figure 5:
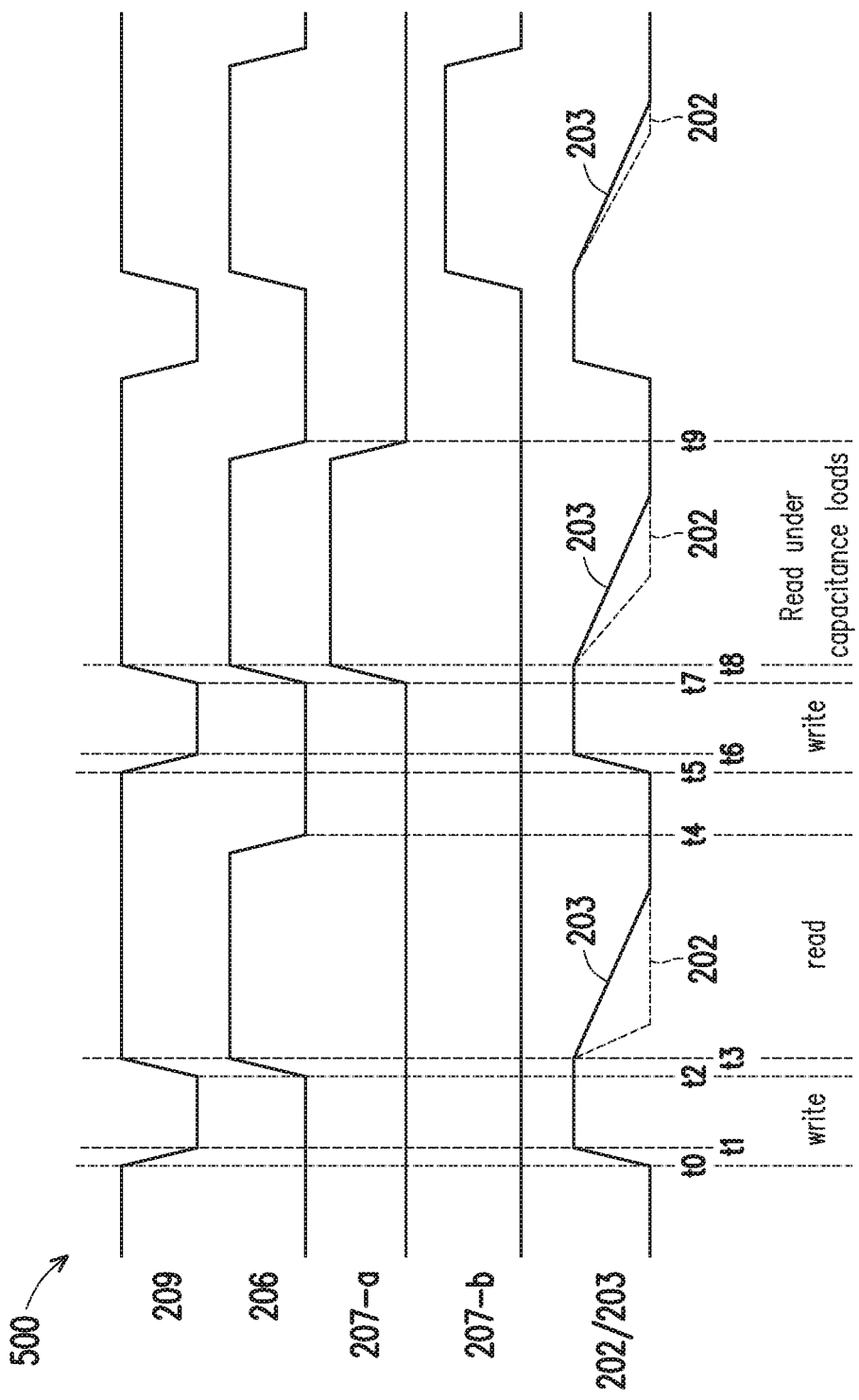
FIG. 5 illustrate exemplary waveforms of signals provided to a bit cell of a PUF cell array, in accordance with some embodiments of the present disclosure.

FIG. 5 illustrate exemplary waveforms 500 of signals provided to a bit cell 300 of a PUF cell array 200, in accordance with some embodiments of the present disclosure. Although the load capacitor is only coupled to BL 202, it should be noted that a number of load capacitors with different capacitance values that are coupled to BL 202 and/or BLB 203 can be enabled to evaluate the stability of bit cells, which are within the scope of this invention.

At time t0, a voltage level on the BPC 209 is pulled down so as to turn on pre-charge transistors 212/213 on BL 202 and BLB 203, respectively. At time t1, the voltage level on the BPC 209 reaches threshold voltages of the pre-charge transistors 202 (e.g., VTH of the 2 pre-charge transistors 202 are equal to GND) and the 2 pre-charge transistors 202 are turned on. At time t3, the pre-charge transistors 212/213 are turned off and the voltage level on the WL 206 is pulled up to enable transistors 302/304, which allows the voltage levels on the BL 202 and BLB 203 to drop. In some embodiments, the discharge rates of on the BL 202 and BLB 203 are different.

At time t4, after a logical state is read from the BL 202 and the BLB 203, the voltage level on the WL 206 is pulled down which turns off the transistors 302/304 to prepare the bit cells for stability evaluation. At t5, the voltage level on the BPC 209 is pulled down so as to enable pre-charge transistors 212/213. At t6, the pre-charge transistors 212/213 are turned on which allows the voltage level on the BL 202 and BLB 203 to charge to VDD. At time t7, the pre-charge transistors 212/213 are turned off and the voltage level on the WL 206 is pulled up in order to turn on transistors 302/304. At time t7, the voltage level on a first load line 207-a coupled to the BL 202 is also pulled up so as to turn on the load line enable transistor 214-a, a discharge pathway through the load capacitor C1 is added to the BL 202, resulting a second discharge transient behavior (dotted lines) on the BL 202. The discharge rate of the second discharge transient behavior on the BL 202 with the load capacitor C1 is smaller than the discharge transient behavior on the BL 202 without the load capacitor C1 and still greater than that on the BLB 203. The bit cell 300 in a column and in a row of the PUF cell array that is selected by the WL 206 is stable.

Figure 6A:
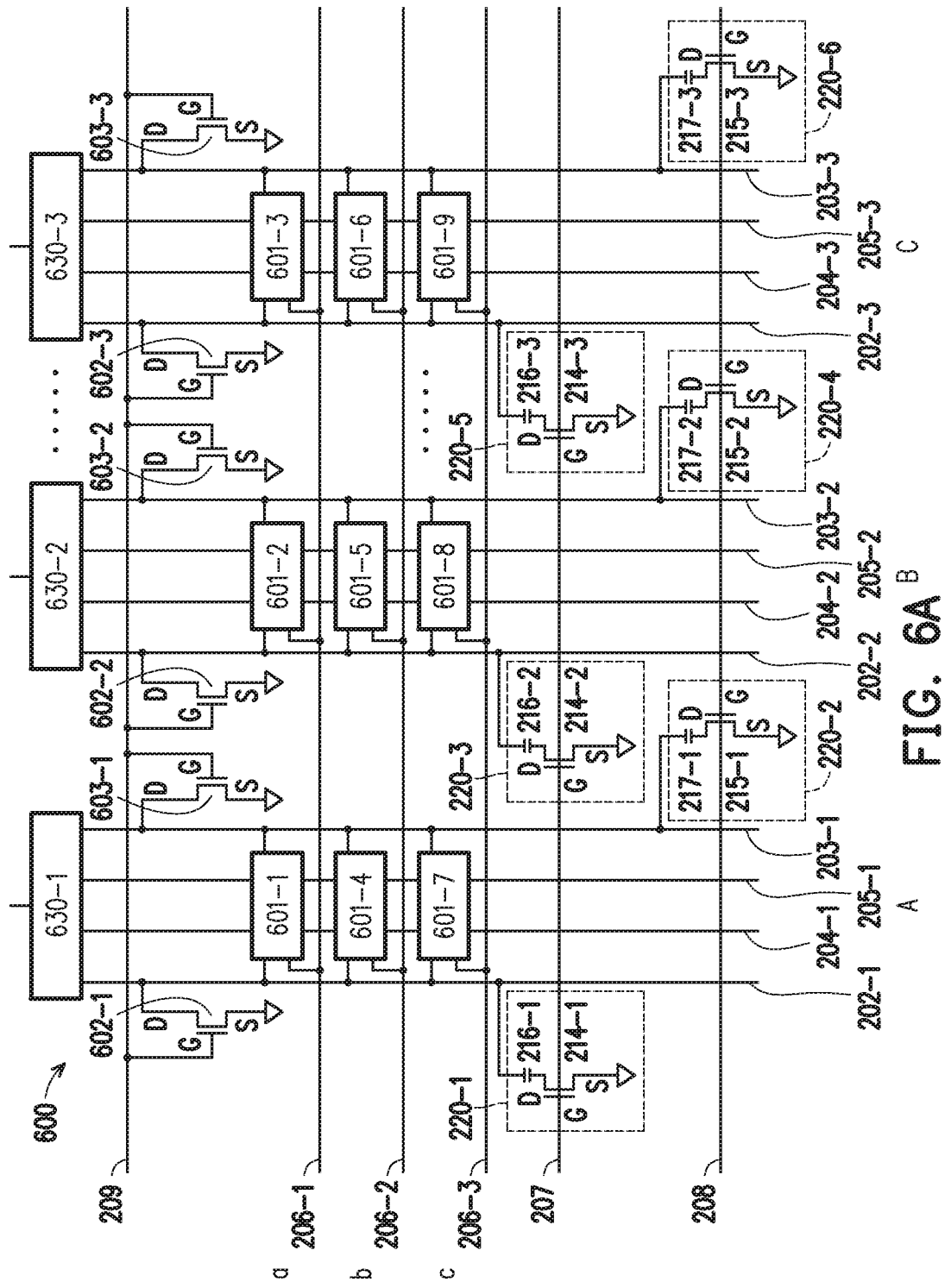
FIG. 6A illustrates an exemplary circuit diagram of a PUF cell array comprising a plurality of bit cells, in accordance with some embodiments of present disclosure.

FIG. 6A illustrates an exemplary circuit diagram of a PUF cell array 600 comprising a plurality of bit cells, in accordance with some embodiments of present disclosure. In some embodiments, the PUF cell array 102 includes a plurality of bit cells 601-1, 601-2, 601-3, 601-4, 601-5, 601-6, 601-7, 601-8, and up to 601-9. Although only 9 bit cells are shown, any desired number of bit cells may be included in the PUF cell array 600 while remaining within the scope of the present disclosure. As described above, the bit cells 601-1, 601-2, 601-3, 601-4, 601-5, 601-6, 601-7, 601-8, and 601-9 are arranged in a column-row configuration. More specifically, in some embodiments, the PUF cell array 102 includes bit lines (BL's) 202-1, 202-2, and 202-3 arranged in parallel, bit line bars (BLB's) 203-1, 203-2, and 203-3 also arranged in parallel, and word lines (WL's) 206-1, 206-2, and 206-3. The WL's 206 are arranged in parallel orthogonally to the BL's 202 and BLB's 203. In some embodiments, the PUF cell array 600 also includes positive supply voltage power (VDD) 204-1, 204-2, and 204-3, and GND (GND) 205-1, 205-2 and 205-3. As such, the PUF cell array 600 may include a first plurality of columns (e.g., arranged vertically), a second plurality of rows (e.g., arranged horizontally), wherein each column includes a respective pair of BL 202, BLB 203, VDD 204, GND 205, and each row includes a respective WL 206. Further, the PUF cell array 102 may also include a BL/BLB pre-charge line (BPC) 209, which is used to charge or discharge the BL's 202 and BLB's 203 of the PUF cell array 600 so as to reset each bit cell.

For example, as shown in the illustrated embodiment of FIG. 6, the PUF cell array 600 includes columns "A," "B," and "C," and rows "a," "b," and "c," wherein column A includes respective BL 202-1, BLB 203-1, VDD 204-1 and GND 205-1; column B includes respective BL 202-2, BLB 203-2, VDD 204-2 and GND 205-2; column C includes respective BL 202-3, BLB 203-3, VDD 204-3 and GND 205-3; row a includes a respective WL 206-1; row b includes a respective WL 206-2; and row c includes a respective WL 206-3.

Moreover, each column includes one or more bit cells that are each coupled to the column's respective BL 202 and BLB 203, a different separate WL. For example, column A includes bit cells 601-1, 601-4, and 601-7, wherein the bit cells 601-1, 601-4, and 601-7 are each coupled to the BL 202-1, BLB 203-1, VDD 204-1, GND 205-1, WL's 206-1, 206-2, and 206-3, respectively; column B includes bit cells 601-2, 601-5, and 601-8, wherein the bit cells 601-2, 601-5, and 601-8 are each coupled to the BL 202-2, BLB 203-2, VDD 204-2, GND 205-2, WL's 206-1, 206-2, and 206-3, respectively; and column C includes bit cells 601-3, 601-6, and 601-9, wherein the bit cells 601-3, 601-6, and 601-9 are each coupled to the BL 202-3, BLB 203-3, VDD 204-3, GND 205-3, WL's 206-1, 206-2, and 206-3, respectively. BL 202 and BLB 203 of a column are coupled to a corresponding sense amplifier enable (SAEN) timing circuit 230. Specifically, BL/BLB 202-1/203-1 are coupled to a first SAEN timing circuit 230-1 of column A; BL/BLB 202-2/203-2 are coupled to a second SAEN timing circuit 230-2 column B; and BL/BLB 202-3/203-3 are coupled to a third SAEN timing circuit 230-3 of column C. In some embodiments, the SAEN timing circuit 630 comprises a sensing amplifier and a corresponding SAEN generator, which are discussed further in detail in FIG. 6B.

In the illustrated embodiment, the BPC 209 is coupled to BL/BLB 202/203 of each column through a pre-discharge transistor 602/603; respectively. Specifically, the BPC 209 is coupled to BL 202-1 through a first PDC transistor 602-1 of column A, wherein drain terminal of the first PDC transistor 602-1 is coupled to the BL 202-1, gate terminal of the first PDC transistor 602-1 coupled to the BPC 209, and source terminal of the first PDC transistor 602-1 is coupled to GND; the BPC 209 is coupled to BLB 203-1 through a second PDC transistor 603-1, wherein drain terminal of the second PDC transistor 603-1 is coupled to the BLB 203-1, gate terminal of the second PDC transistor 603-1 is coupled to the BPC 209 and source terminal of the second PDC transistor 603-1 is coupled to GND; the BPC 209 is coupled to BL 202-2 through a first PDC transistor 602-2 of column B, wherein drain terminal of the first PDC transistor 602-2 of column B is coupled to the BL 202-2, gate terminal of the first PDC transistor 602-2 of column B is coupled to the BPC 209, and source terminal of the first PDC transistor 602-2 of column B is coupled to GND; the BPC 209 is coupled to BLB 203-2 through a second PDC transistor 603-2 of column B, wherein drain terminal of the second PDC transistor 603-2 of column B is coupled to the BLB 203-2, gate terminal of the second PDC transistor 603-2 is coupled to the BPC 209, and source terminal of the second PDC transistor 603-2 of column B is coupled to GND; the BPC 209 is coupled to BL 202-3 through a first PDC transistor 602-3 of column C, wherein drain terminal of the first PDC transistor 602-3 of column C is coupled to the BL 202-3, gate terminal of the first PDC transistor 602-3 of column C is coupled to the BPC 209, and source terminal of the first PDC transistor 602-3 of column C is coupled to GND; and the BPC 209 is coupled to BLB 203-3 through a second PDC transistor 603-3 of column C, wherein drain terminal of the second PDC transistor 603-3 of column C is coupled to the BLB 203-3, gate terminal of the second PDC transistor 603-3 of column C is coupled to the BPC 209 and source terminal of the second PDC transistor 603-3 of column C is coupled to GND.

In some embodiments, a first load line 207 and a second load line 208 are coupled to the BLs 202 and BLBs 203 through a corresponding a load control circuit 220. In some embodiments, the load control circuit 220 comprises at least one capacitor and at least one transistor for each bit-line (BL 202 or BLB 203), e.g., a first load control circuit 220-1 and a second load control circuit 220-2 for the BL 202-1 and BLB 203-1 of column A, respectively; a third load control circuit 220-3 and a fourth load control circuit 220-4 for the BL 202-2 and BLB 203-2 of column B, respectively; and a fifth load control circuit 220-5 and a sixth load control circuit 220-6 for the BL 202-3 and BLB 203-3 of column C, respectively. In some other embodiments, the load control circuit can comprise a plurality of capacitors and a plurality of transistors, which are discussed in further detail in FIG. 2B.

Referring back to FIG. 6 again, in the illustrated embodiment, the first load line 207 is coupled to the BL's 202 through first corresponding load capacitors 216 and serially connected corresponding load line enable transistors 214. Specifically, drain terminal of the load line enable transistor 214-1 is coupled with one terminal of the capacitor load 216-1 and the other terminal of the capacitor load 216-1 is coupled to the BL 202-1. Source terminal of the load line enable transistor 214-1 is coupled to GND and gate terminal of the load line enable transistor 214-1 is coupled to the first load line 207. Similarly, drain terminal of the load line enable transistor 214-2 is coupled with one terminal of the capacitor load 216-2 and the other terminal of the capacitor load 216-2 is coupled to the BL 202-2. Source terminal of the load line enable transistor 214-2 is coupled to GND and gate terminal of the load line enable transistor 214-2 is coupled to the first load line 207. Further, drain terminal of the load line enable transistor 214-3 is coupled with one terminal of the capacitor load 216-3 and the other terminal of the capacitor load 216-3 is coupled to the BL 202-3. Source terminal of the load line enable transistor 214-3 is coupled to GND and gate terminal of the load line enable transistor 214-3 is coupled to the first load line 207.

In the illustrated embodiment, a second load line 208 is coupled to the BLB's 203 through corresponding load capacitors 217 and serially connected corresponding load line enable transistors 215. Specifically, drain terminal of the load line enable transistor 215-1 is coupled with one terminal of the capacitor load 217-1 and the other terminal of the capacitor load 217-1 is coupled to the BLB 203-1. Source terminal of the load line enable transistor 215-1 is coupled to GND and gate terminal of the load line enable transistor 215-1 is coupled to the second load line 208. Similarly, drain terminal of the load line enable transistor 215-2 is coupled with one terminal of the capacitor load 217-2 and the other terminal of the capacitor load 217-2 is coupled to the BLB 203-2. Source terminal of the load line enable transistor 215-2 is coupled to GND and gate terminal of the load line enable transistor 215-2 is coupled to the second load line 208. Further, drain terminal of the load line enable transistor 215-3 is coupled with one terminal of the capacitor load 217-3 and the other terminal of the capacitor load 217-3 is coupled to the BLB 203-3. Source terminal of the load line enable transistor 215-3 is coupled to GND and gate terminal of the load line enable transistor 215-3 is coupled to the second load line 208.

In some embodiments, the transistor 212-1, 212-2, 212-3, 213-1, 213-2 and 213-3 each comprises a PMOS transistor and the transistors 214-1, 214-2, 214-3, 215-1, 215-2, and 215-3 each comprises an NMOS transistor. In some embodiments, the load capacitors 216-1, 216-2, 216-3, 217-1, 217-2, and 217-3 can be MOS capacitors by connecting source and drain terminals together.

As described above, each bit cell of the PUF cell array 600 (e.g., 601-1, 601-2, 601-3, 601-4, 600-5, 601-6, 600-7, 601-8, 601-9, etc.) may include a plurality of transistors (e.g., 2 transistors). In some embodiments, a logical state stored in each bit cell may be written to the bit cell by applying either a high state (i.e., a logical "1") or a low state (i.e., a logical "0") through a corresponding BL, BLB, and WL. It should be also noted that FIG. 6 is only an example for illustration purposes and is not intended to be limiting. The type of signal lines in a PUF cell array 600 in in this present disclosure can be arranged in different ways depending on the circuit layout design and types of bit cells used in the array.

Figure 6B:
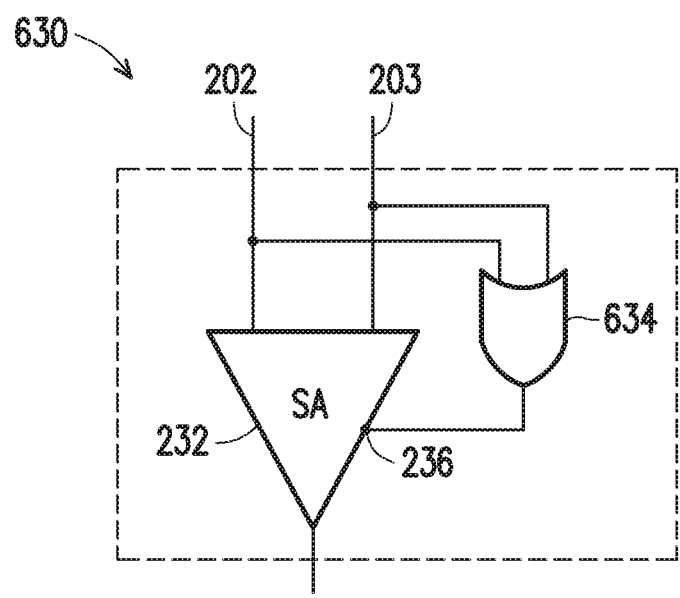
FIG. 6B illustrates an exemplary circuit diagram of a load control circuit, in accordance with some embodiments of the present disclosure.

FIG. 6B illustrates an exemplary circuit diagram of a sense amplifier enable (SAEN) timing circuit 630, in accordance with some embodiments of the present disclosure. In the illustrated embodiments, the SAEN timing circuit 630 comprises a sense amplifier (SA) 232 and an OR gate 634. In some embodiments, inputs of the SA 232 and the OR gate 634 each are coupled directly to a BL 202 and a BLB 203. The output of the OR gate 634 is then coupled to the enabling terminal 236 of the SA 232. During operation, when voltage levels on the BL 202 and BLB 203 are both below a trigger point, the OR gate 634 outputs a "0" which is further coupled to the enabling terminal 236 so as to turn off the SA 232. When at least one of the voltage levels on the BL 202 and BLB 203 increases above the trigger point, the OR gate 634 outputs a "1" which is coupled to the enabling terminal 236 so as to turn on the SA 232 in order to determine the logical state of the bit cell coupled to the BL 202 and the BLB 203 by amplifying the voltage difference between the BL 202 and BLB 203 on the inputs of the SA 232 (e.g., N-type transistors). In some other embodiments, a NOR gate 634 can be used to replace the OR gate 634 in FIG. 6B, in which the output of "0" when at least one of the voltage levels on the BL 202 and BLB 203 increases above the trigger point is used to enable a SA 232 with a complementary design containing, for example, P-type transistors.

Figure 7:
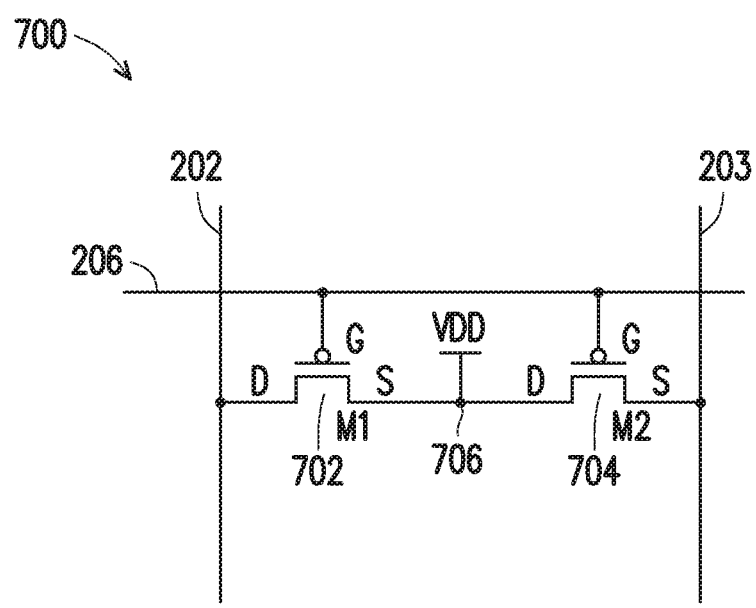
FIG. 7 illustrates an exemplary circuit diagram of a bit cell, in accordance with some embodiments of the present disclosure.

FIG. 7 illustrates an exemplary circuit diagram of a bit cell 700, in accordance with some embodiments of the present disclosure. In some embodiments, the bit cell 700 is a pre-discharge bit cell and comprises 2 transistors: M1 702 and M2 704. Source terminal of the first transistor M1 702 is coupled to drain terminal of the second transistor M2 704, which are further coupled to node 706 and to GND. Drain terminal of the first transistor M1 702 and source terminal of the second transistor M2 704 are coupled to BL 202 and BLB 203, respectively. Further, gate terminals of the first and second transistors 702/704 are both coupled to a WL 206.

In some embodiments, the transistors M1 702 and M2 704 each includes a PMOS transistor. Although the illustrated embodiments of FIGS. 6 and 7 shows that transistors are either NMOS or PMOS transistors, any of a variety of transistors or devices that are suitable for use in a memory device may be implemented such as, for example, a bipolar junction transistor (BJT), a high-electron mobility transistor (HEMT), etc.

Figure 8:
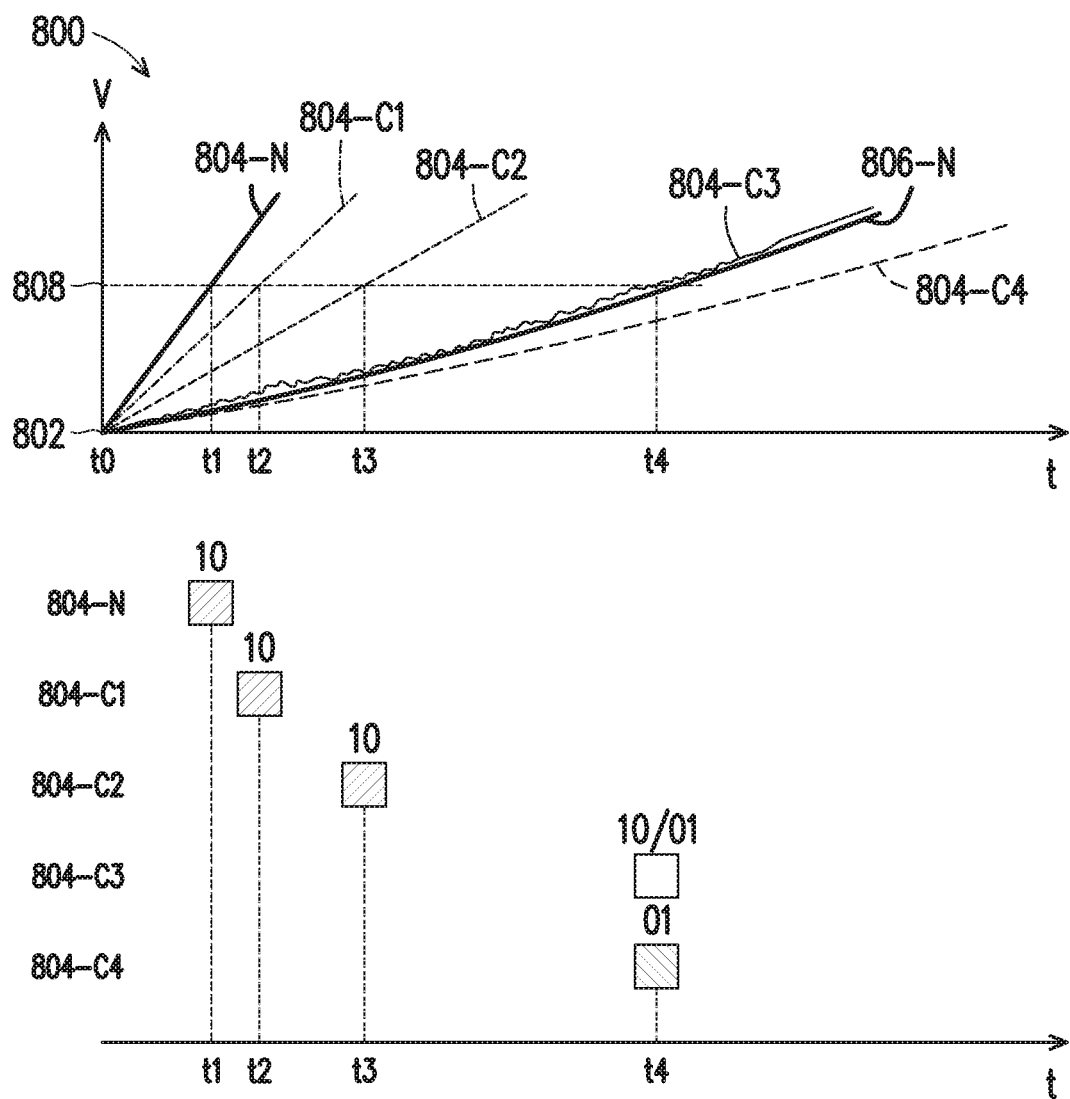
FIG. 8 illustrates exemplary signals on BL/BLB of a bit cell to determine a stability of the bit cell using load capacitors, in accordance with some embodiments of the present disclosure.

FIG. 8 illustrates exemplary signals 800 on BL 202/BLB 203 of a bit cell 700 to determine a stability of the bit cell 700 using load capacitors, in accordance with some embodiments of the present disclosure. In some embodiments, the BL 202 and BLB 203 are pulled down to GND by turning on corresponding pre-discharge transistors 602/603 in FIG. 6 by pulling up the voltage level on the BPC 209.

In some embodiments, initial voltages before charging Vs 802 on the BL 202/BLB 203 are determined by the threshold voltages of the pre-discharge transistors 602/603 coupled to the BL 202/BLB 203. In some embodiments, the Vs 802 on the BL 202 and Vs 802 on the BLB 203 are equal to GND.

When the BL 202 and BLB 203 are pre-discharged to their corresponding Vs 802 (e.g., GND), the voltage on the BPC 209 is then pulled down to turn off the pre-discharge transistors 602/603 and the access transistors M1 702 and M2 704 are then turned on by pulling down the voltage on the WL 206 at t0. Current flow through the access transistors from the node 706 (VDD) to the BL 202/BLB 203 (GND), resulting in an increase of voltage levels on the BL 202/BLB 203. Due to the intrinsic local variations, e.g., channel width, channel length, oxide thickness, etc., the charge rates of voltage levels on the BL 202/BLB 203 are therefore different.

Linear transient charge behaviors on the BL 202/BLB 203 are used to illustrate a process to test the stability of bit cells using load capacitors and a generation process of a PUF output, in accordance with various embodiments. For clarity, the numeral 804-N, 804-C1, 804-C2, 804-C3, and 804-C4 are used to refer to the transient charge behaviors on BL 202 with no load capacitor, a first load capacitor C1, a second load capacitor C2, a third load capacitor C3, and a fourth load capacitor C4, respectively. Further, the numeral 806 are used to refer to the transient charge behaviors on BLB 203 with no load capacitor. To illustrate the concept of adding load capacitors to facilitate the identification of unstable bit cells, load capacitors are only added to the BL 202. It should be noted that any numbers of load capacitors can be added to BL 202 and/or BLB 203. Transient charge behaviors 804/806 depend on the mechanisms that govern the conduction in the channel. In some embodiments, the transient charge behavior is a function of the geometry of the transistor (channel length, gate oxide thickness, etc.), dielectric constant, threshold voltage ($V_{TH}$), initial voltage before charging (Vs), mobility of electrical carriers, temperature, etc. In some embodiments, the first access transistor M1 702 charge faster than the second access transistor M2 704, resulting in two distinguishable charge rates for the transient charge behaviors 804-N and 806-N. In some embodiments, the transient charge behaviors 804/806 can be exponential.

Different charge rate in the transient charge behaviors 804/806 on the BL 202/BLB 203 can result in different time to fully charge and most importantly, different time to reach a trigger point 808. For clarity purposes, a constant trigger point 808 (i.e., VDD/2) is used, according to some embodiments. When the voltage levels on the BL 202 and the BLB 203 are both below the trigger point 808 (i.e., before the 804-N reaches the trigger point 808, t<t1), the OR 634 outputs "0" on the enabling terminal 236 which disables the SA 232. When a transient discharge behavior 804-N reaches the trigger point 808 at time t1 (i.e., t1<t<t4), the OR gate 634 provides a "1" on the enabling terminal 236, which enables the SA 232, as illustrated in FIG. 6B. In order to identify unstable bit cells, load capacitors can be added after resetting the BL 202/BLB 203 and re-discharge it to their initial voltage (GND) before charging. In the illustrated embodiments, after turning on the load line enable transistor 214-1a, a discharge pathway through the load capacitor C1 is added to the BL 202, resulting a second charge transient behavior (e.g., 804-C1) on the BL 202. In some embodiments, the charge rate of the transient behavior 804-C1 is smaller than that of the 804-N and greater than that of the 806-N. In some embodiments, when the voltage level on the BL 202 increases to a level greater than the trigger point 808 (i.e., VDD/2) after t2, the SA reads a "1" on the BL 202 and a "0" on the BLB 203. Similarly, after turning on the load line enable transistor 214-1b, a discharge pathway through the load capacitor C2 is added to the BL 202, resulting a third charge transient behavior (e.g., 804-C2) on the BL 202. In some embodiments, the charge rate of the transient behavior 804-C2 is smaller than that of the 804-C1 and greater than that of the 806-N. In some embodiments, when the voltage level on the BL 202 increases to a level greater than the trigger point 808 (i.e., VDD/2) after t3, the SA reads "1" on the BL 202 and "0" on the BLB 203.

In some embodiments, the added load capacitor can reduce the charge rate on the BL 202 to a rate that is comparable to that on the BLB 203, in which the bit cell becomes unstable. For example, in the illustrated embodiment, a load capacitor C3 is added to the BL 202 and the charge rate of the transient behavior 804-C3 is equal to or comparable to that of the 806-N. At time t4 when the voltage levels of both of the transient behaviors 806-N and 804-C3 increase above the trigger point 808, the SA is not able to resolve the difference between the voltage levels on the BL 202/BLB 203 and the bit cell becomes unstable with the load capacitor C3. Similarly, after turning on the load line enable transistor 214, a discharge pathway through the load capacitor C4 is added to the BL 202, resulting a fifth discharge transient behavior (e.g., 804-C4) on the BL 202. In some embodiments, the charge rate of the transient behavior 804-C4 is smaller than that of the 806-N. In some embodiments, when the voltage level on the BLB 203 increases to a level greater than the trigger point 808 (i.e., VDD/2) after t4, the SA reads "0" on the BL 202 and "1" on the BLB 203. The polarity is changed and thus the bit cell which provides outputs to the BL 202/BLB 203 becomes unstable.

Figure 9:
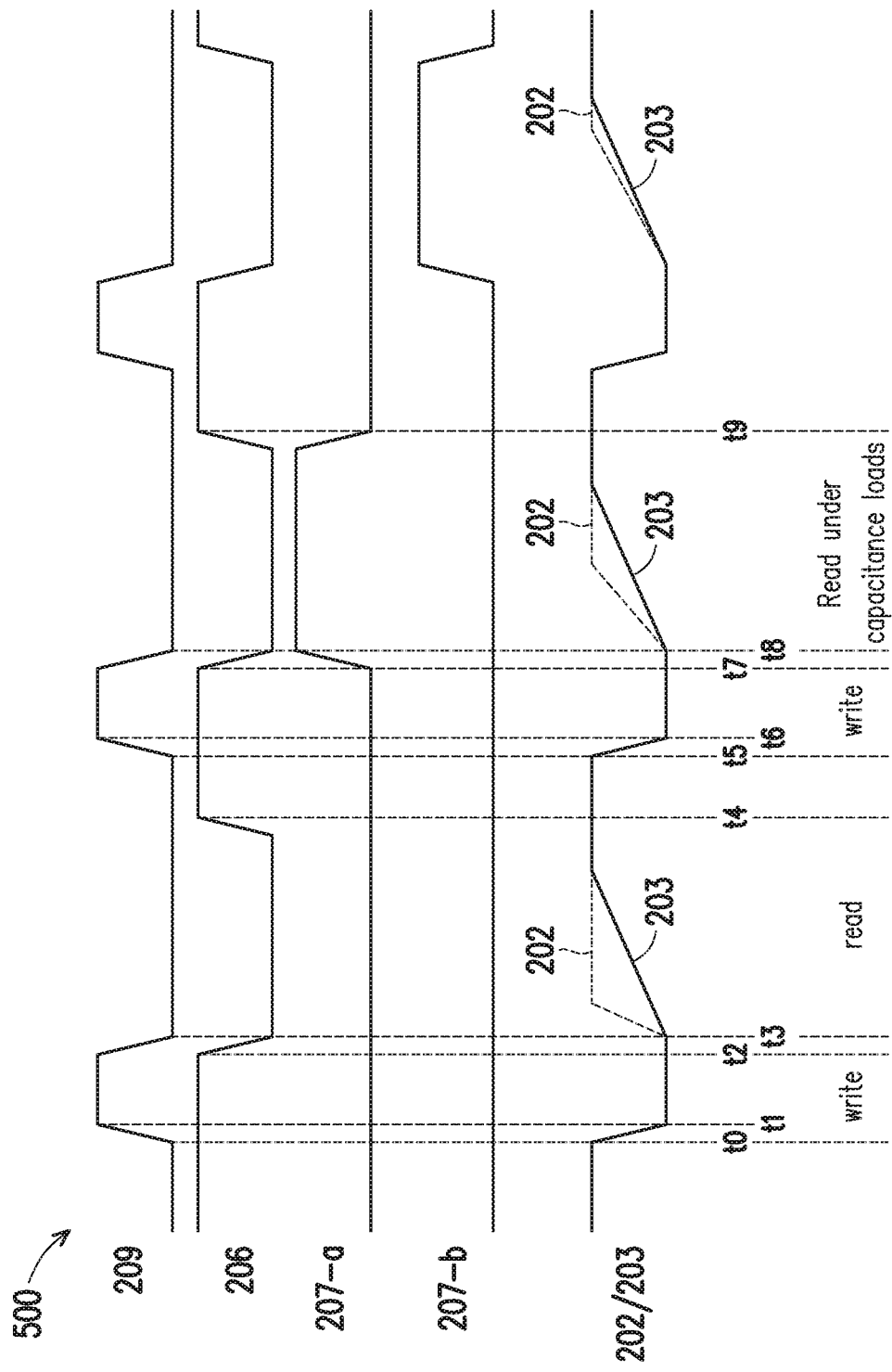
FIG. 9 illustrate exemplary waveforms of signals provided to a bit cell of a PUF cell array, in accordance with some embodiments of the present disclosure.

FIG. 9 illustrate exemplary waveforms 900 of signals provided to a bit cell 700 of a PUF cell array 200, in accordance with some embodiments of the present disclosure. Although the load capacitor is only coupled to BL 202, it should be noted that a number of load capacitors with different capacitance values that are coupled to BL 202 and/or BLB 203 can be enabled to evaluate the stability of bit cells, which are within the scope of this invention.

At time t0, a voltage level on the BPC 209 is pulled up so as to turn on pre-discharge transistors 602/603 on BL 202 and BLB 203, respectively. At time t1, the voltage level on the BPC 209 reaches threshold voltages of the pre-discharge transistors 602/603 (e.g., GND) and the pre-discharge transistors 602/603 are turned on. At time t3, the pre-discharge transistors 602/603 are turned off and the voltage level on the WL 206 is pulled down to enable transistors 702/704 in the bit cell 700, which allows the voltage levels on the BL 202 and BLB 203 to increase. In some embodiments, the charge rates of on the BL 202 and BLB 203 are different.

At time t4, after a logical state is read from the BL 202 and the BLB 203, the voltage level on the WL 206 is pulled up which turns off the transistors 702/704 to prepare the bit cells for stability evaluation. At t5, the voltage level on the BPC 209 is pulled up so as to enable pre-discharge transistors 602/603. At t6, the pre-discharge transistors 602/603 are turned on which allows the voltage level on the BL 202 and BLB 203 to discharge to GND. At time t7, the pre-discharge transistors 602/603 are turned off and the voltage level on the WL 206 is pulled down in order to turn on transistors 702/704. At time t7, the voltage level on a first load line 207-*a* coupled to the BL 202 is also pulled up so as to turn on the load line enable transistor 214-*a*, a discharge pathway through the load capacitor C1 is added to the BL 202, resulting a second charge transient behavior (dotted lines) on the BL 202. The charge rate of the second charge transient behavior on the BL 202 with the load capacitor C1 is smaller than the charge transient behavior on the BL 202 without the load capacitor C1 and still greater than that on the BLB 203. The bit cell 700 in a column and in a row of the PUF cell array that is selected by the WL 206 is stable.

This evaluation process with different load capacitance values on the BL 202 and/or BLB 203 are repeated multiple times guided by a predetermined criterion so as to determine the stability of the bit cell 700. Through multiple iterations by changing the load capacitance values on the BL 202 and BLB 203, unstable bit cells 700 in one or more selected rows in the PUF cell array 600 can be identified and a masking map containing addresses of the unstable bit cells can be generated.

Figure 10:
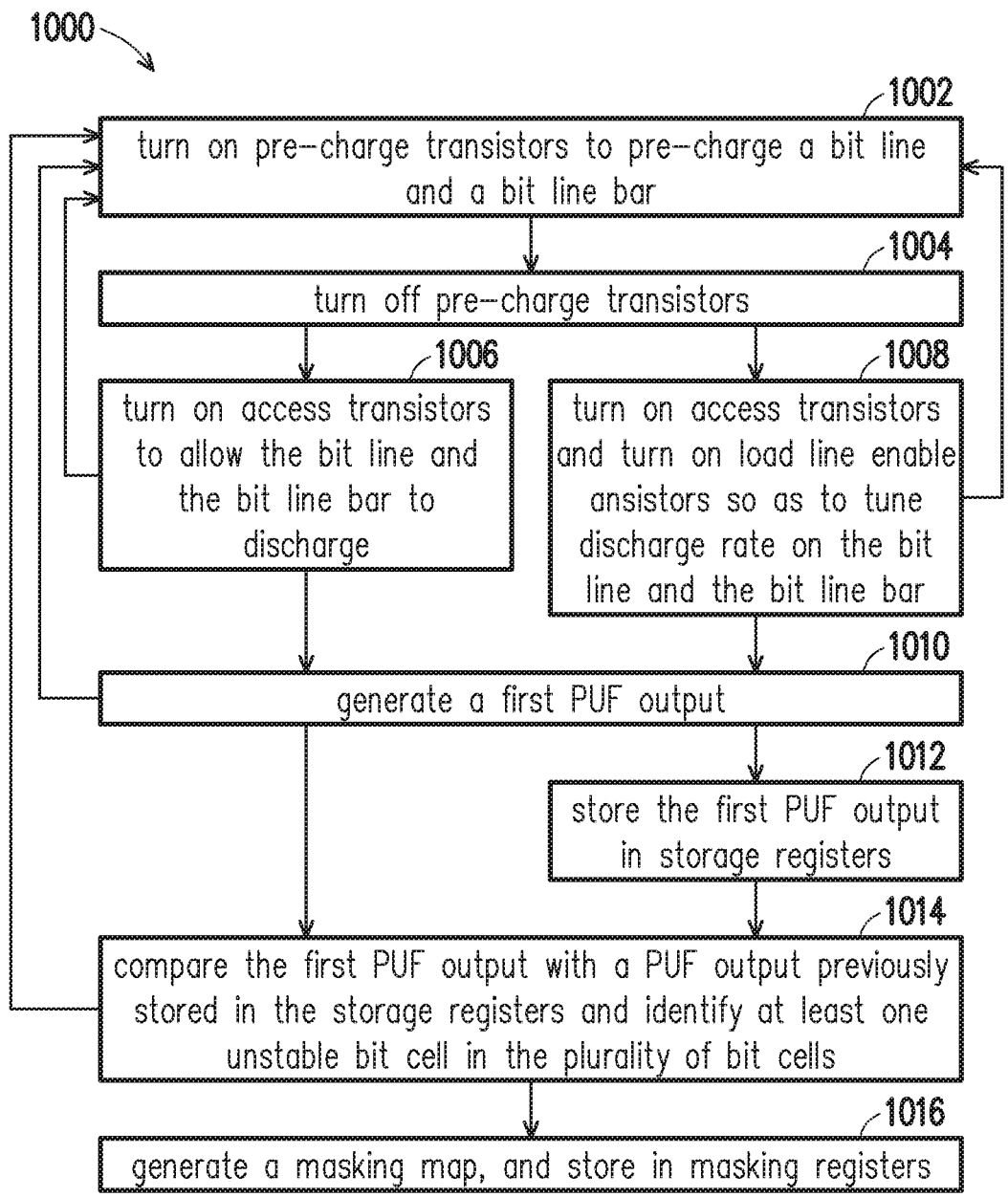
FIG. 10 illustrates a flow chart of a method to generate a masking map using a PUF cell array comprising a plurality of bit cells, in accordance with some embodiments of present disclosure.

FIG. 10 illustrates a flow chart of a method 1000 to generate a masking map using a PUF cell array 200 comprising a plurality of bit cells 300, in accordance with some embodiments of present disclosure. In some embodiments, the operations of method 600 are performed by the respective components illustrated in FIGS. 1-3. For purposes of discussion, the following embodiment of the method 1000 will be described in conjunction with FIGS. 1-3. The illustrated embodiment of the method 1000 is merely an example for generating a masking map. Therefore, it should be understood that any of a variety of operations may be omitted, re-sequenced, and/or added while remaining within the scope of the present disclosure.

The method 1000 starts with operation 1002 in which two pre-charge transistors 212/213 coupled to BL 202/BLB 203 in a column of a PUF cell array 200 are turned on to pre-charge BL 202 and BLB 203 to VDD according to some embodiments. In some embodiments, a voltage level on BPC 209 is pulled down to enable the two pre-charge transistors 212/213. In some embodiments, the two pre-charge transistors 212/213 each is a PMOS transistor.

The method 1000 continues with operation 1004 in which the two pre-charge transistors 212 and 213 in a column of a PUF cell array 200 are turned off according to some embodiments.

The method 1000 continues with operation 1006 in which two access transistors 302/304 of each of bit cells in a row are turned on according to some embodiments. In some embodiments, the two access transistors 302/304 of each of the bit cells in a row are turned on by pulling up the voltage level on the WL 206. In some embodiments, the two access transistors 302/304 are turned on so as to allow the corresponding BL 202 and BLB 203 to discharge to GND.

The method 1000 continues with operations 1002-1006 so as to obtain outputs from all the bit cells 300 in the PUF cell array 200. Once all the bit cells 300 are evaluated, the method 1000 continues to operation 1010 in which a first PUF output is generated.

The method 1000 continues to operation 1012 in which the first PUF output generated is stored in storage registers 120. In some embodiments, the storage registers 120 can be implemented with any type of on-chip memory design, including on-chip SRAMs. In some embodiments, the storage register 120 comprises on-chip memory array that contains the same number of bits as the number of bit cells in the PUF cell array 102 of the PUF generator 100. In some embodiments, the storage registers 120 comprise the same number of bits as the number of bit cells in the PUF cell array 102.

Before the method 1000 continues to operation 1012, the method 1000 continues with operation 1002 in which the two pre-charge transistors 212/213 coupled to BL 202/BLB 203 in a column of a PUF cell array 200 are turned on again to pre-charge BL 202 and BLB 203 to VDD according to some embodiments. In some embodiments, a voltage level on BPC 209 is pulled down to enable the two pre-charge transistors 212/213. In some embodiments, the two pre-charge transistors 212/213 each is a PMOS transistor. The method 1000 continues with operation 1004 in which the two pre-charge transistors 212 and 213 in a column of a PUF cell array 200 are turned off according to some embodiments.

The method 1000 continues with operation 1008 in which two access transistors 302/304 of each of bit cells in a row are turned on according to some embodiments. In some embodiments, the two access transistors 302/304 of each of the bit cells in a row are turned on by pulling up the voltage level on the WL 206. In some embodiments, the two access transistors 302/304 are turned on so as to allow the corresponding BL 202 and BLB 203 to discharge to GND. In some embodiments, in the operation 1008, a load line enable transistor is turned on so as to enable load capacitors and a discharge pathway, which changes discharge rates of the voltage levels on the BL 202 and BLB 203.

The method 1000 continues with operations 1002, 1004, and 1008 so as to obtain outputs from all the bit cells 300 in the PUF cell array 200 with a first load capacitor. Once stability of all the bit cells 300 are evaluated using the first load capacitor, the method 1000 continues with operation 1010 in which a second PUF output is generated.

The method 1000 continues to operation 1014, in which the second PUF output generated with the first load capacitor is then compared with the previously stored PUF output (e.g., the first PUF output generated without the first load capacitor) to identify at least one bit cell with different logical states in the two PUF outputs. In some embodiments, each bit of the PUF output from the bit cells in at least one selected rows of the PUF cell array 200 is compared. In some embodiments, the storage registers 120 store only one PUF output. In some embodiments, a bit cell with different logical states in the two PUF outputs is identified as an unstable (hereinafter "U") bit cell. In some embodiments, an address of the unstable bit cell in the PUF cell array is then stored in a bit of masking registers 124.

Through repeated operation 1002-1014, multiple PUF outputs from bit cells with different load capacitors can be generated and compared so as to identify unstable bit cells 300 in the PUF cell array 200.

The method 1000 continues with operation 1016 in which a masking map is generated according to some embodiments. In some embodiments, the masking map comprises an address of the at least one unstable bit cell in the plurality of bit cells 300 of the PUF cell array 102. In some embodiments, the masking map comprises at least one address of at least one corresponding unstable bit cell 300 in the PUF cell array 200.

Figure 11:
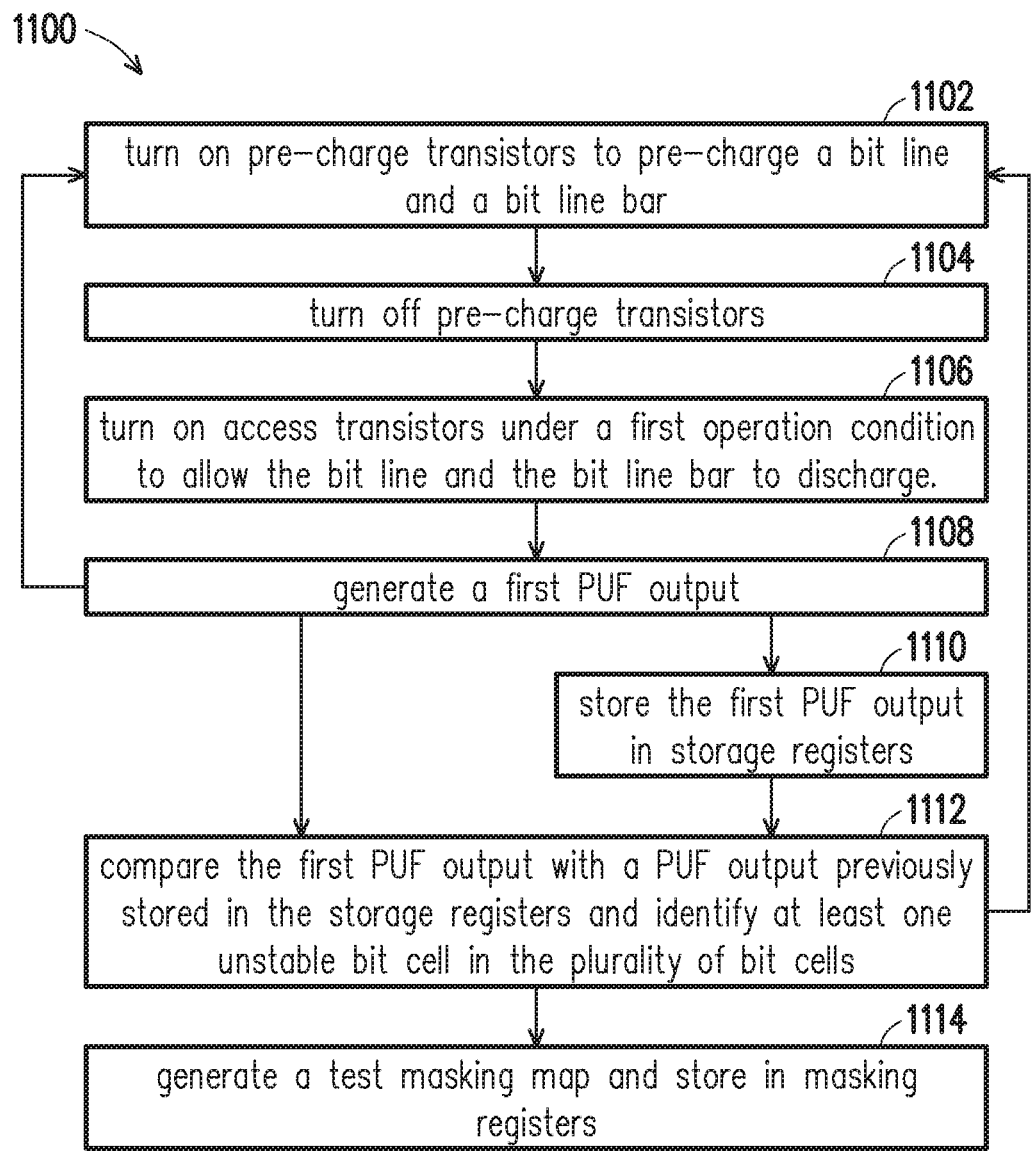
FIG. 11 illustrates a flow chart of a method to generate a test masking map using a PUF cell array comprising a plurality of bit cells, in accordance with some embodiments of the present disclosure.

FIG. 11 illustrates a flow chart of a method 1100 to generate a test masking map using a PUF cell array 200 comprising a plurality of bit cells 300, in accordance with some embodiments of the present disclosure. In some embodiments, the operations of method 1100 are performed by the respective components illustrated in FIGS. 1-3. For purposes of discussion, the following embodiment of the method 1100 will be described in conjunction with FIGS. 1-3. The illustrated embodiment of the method 1100 is merely an example for generating a test masking map. Therefore, it should be understood that any of a variety of operations may be omitted, re-sequenced, and/or added while remaining within the scope of the present disclosure.

The method 1100 starts with operation 1102 in which two pre-charge transistors 212/213 coupled to BL 202/BLB 203 in a column of a PUF cell array 200 are turned on to pre-charge BL 202 and BLB 203 to VDD according to some embodiments. In some embodiments, a voltage level on BPC 209 is pulled down to enable the two pre-charge transistors 212/213. In some embodiments, the two pre-charge transistors 212/213 each is a PMOS transistor.

The method 1100 continues with operation 1104 in which the two pre-charge transistors 212 and 213 in a column of a PUF cell array 200 are turned off according to some embodiments.

The method 1100 continues with operation 1106 in which two access transistors 302/304 of each of bit cells in a row are turned on according to some embodiments. In some embodiments, the two access transistors 302/304 of each of the bit cells in a row are turned on by pulling up the voltage level on the WL 206. In some embodiments, the two access transistors 302/304 are turned on so as to allow the corresponding BL 202 and BLB 203 to discharge to GND.

The method 1100 continues with operations 1102-1106 so as to obtain outputs from all the bit cells 300 in the PUF cell array 200. Once all the bit cells 300 are evaluated, the method 1100 continues to operation 1108 in which a first PUF output is generated.

The method 1100 continues to operation 1110 in which the first PUF output generated is stored in storage registers 120. In some embodiments, the storage registers 120 can be implemented with any type of on-chip memory design, including on-chip SRAMs. In some embodiments, the storage register 120 comprises on-chip memory array that contains the same number of bits as the number of bit cells in the PUF cell array 102 of the PUF generator 100. In some embodiments, the storage registers 120 comprise the same number of bits as the number of bit cells in the PUF cell array 102.

Before the method 1100 continues to operation 1112, operations 1102-1108 are repeated to generate a second PUF outputs at a different operation condition (i.e., a different temperature and/or a different $V_{DD}/V_{SS}$). The second PUF output under a second operation condition can be then generated.

The method 1100 continues to operation 1112 the second PUF output generated under the second operation condition is then compared with the previously stored PUF output (e.g., the first PUF output generated under the first operation condition) to identify at least one bit cell with different logical states in the two PUF outputs. In some embodiments, each bit of the PUF output from the bit cells in at least one selected rows of the PUF cell array 102 is compared. In some embodiments, the storage registers 120 store only one PUF output. In some embodiments, a bit cell with different logical states in the two PUF outputs is identified as an unstable (hereinafter "U") bit cell. In some embodiments, an address of the unstable bit cell in the PUF cell array is then stored in a bit of masking registers 124.

Through repeated operations 1102-1112, multiple PUF outputs under different operation conditions by operating at different temperatures (T) and/or operational voltage values (V) can be generated and compared so as to identify unstable bit cells 300 in the PUF cell array 200. In some embodiments, the different temperatures is selected in a typical temperature range of −40~125 degrees Celsius (° C.). In some embodiments, the operation voltage values are within ±10% nominal values of the normal operation condition (i.e., VDD=0.9 Volt), which is in a range of 0.81~0.99 Volt. Any testing sequences by changing the order of setting values or any number of tests at any other temperatures/voltage levels is within the scope of this invention.

The method 1100 continues to operation 1114 in which a test masking map is generated. In some embodiments, the test masking map comprises an address of the at least one unstable bit cell in the plurality of bit cells 300 of the PUF cell array 102.

Figure 12:
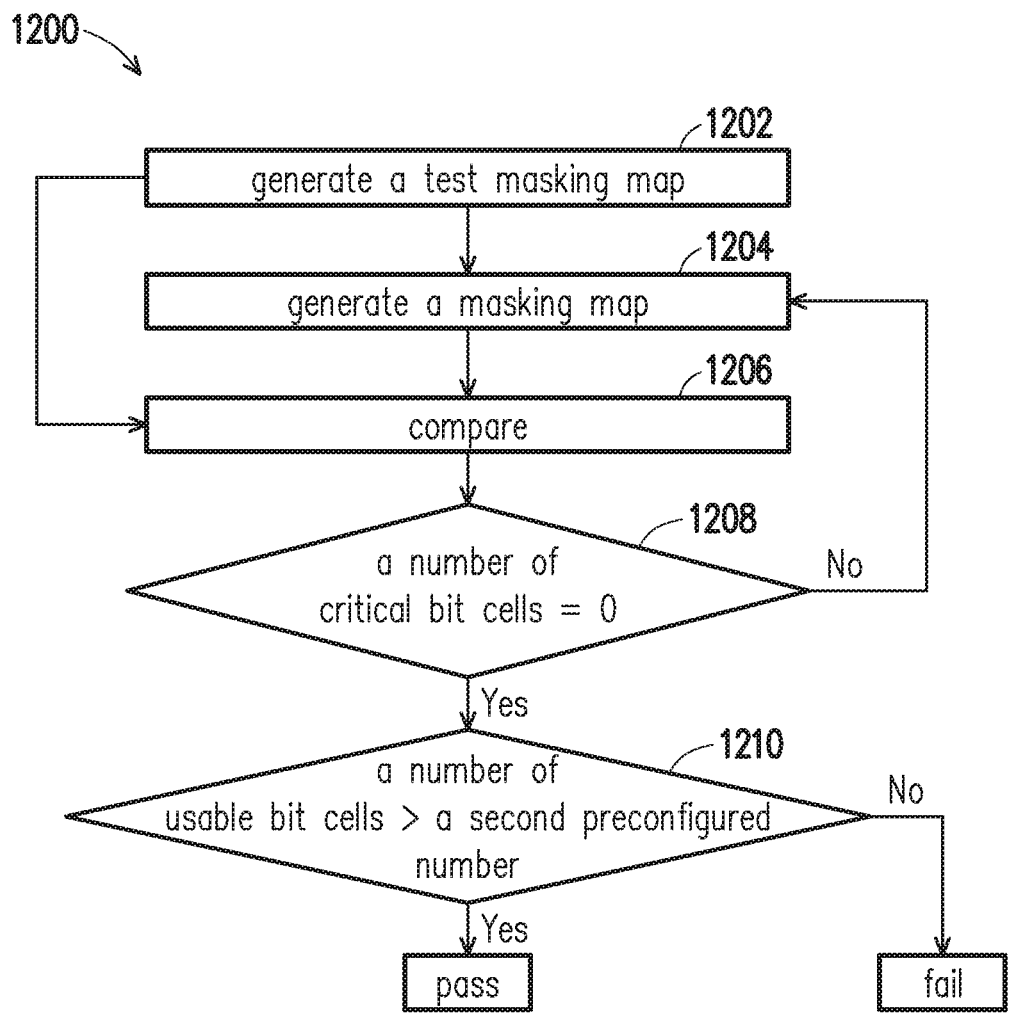
FIG. 12 illustrates a flow chart of a method for a PUF generator characterization, in accordance with some embodiments of present disclosure.

FIG. 12 illustrates a flow chart of a method 1200 for a PUF generator characterization, in accordance with some embodiments of present disclosure. In some embodiments, the operations of method 1200 are performed by the respective components illustrated in FIGS. 1-3, the method 1000 in FIG. 10 and the method 1100 in FIG. 11. For purposes of discussion, the following embodiment of the method 800 will be described in conjunction with FIGS. 1-3, 10 and 11. The illustrated embodiment of the method 1200 is merely an example. Therefore, it should be understood that any of a variety of operations may be omitted, re-sequenced, and/or added while remaining within the scope of the present disclosure.

The method 1200 starts with operation 1202 in which a test masking map is generated on a PUF cell array 200. In some embodiments, the test masking map is generated using the method 1100 as shown in FIG. 1 using a PUF cell array 200 consisting a plurality of bit cells 300 as shown in FIG. 3. It should be noted that operations to identify unstable bit at different temperatures and operational voltage levels can be different according the type of bit cells, which are within the scope of this invention. For example, in a leakage-based DRAM bit cell, a flipped logic state caused by leakage currents is determined at different temperatures and operational voltages to determine a golden map. In some embodiments, different conditions includes different operation temperatures and voltages. In some embodiments, different temperature is controlled by a temperature control unit. In some embodiments, operational voltage is controlled by the controller 112.

The method 1200 continues to operation 1204 in which a masking map is generated on the PUF cell array 200. In some embodiments, the masking map is generated using the method 1000 as shown in FIG. 10 using a PUF cell array 200 consisting a plurality of bit cells 300 as shown in FIG. 3. It should be noted that different stressed operation conditions to identify unstable bit cells using different techniques can be used according to the type of bit cells and are within the scope of this invention. For example, in a leakage-based DRAM bit cell, one can use a noise injector, such as a ring oscillator to introduce signal oscillation to the voltage lines.

The method 1200 continues to operation 1206 in which the test masking map obtained from operation 1202 is compared with the masking map obtained in operation 1204 to obtain a critical masking map. In some embodiments, an usable (U) bit cell in the critical masking map is a bit cell that are stable in both the masking map and the test masking map; a non-usable (N) bit cell in the critical masking map is a bit cell that is unstable in the masking map; and a critical (C) bit cell in the critical masking map is a bit cell that is stable in the masking map but not stable in the test masking map.

Figure 13:
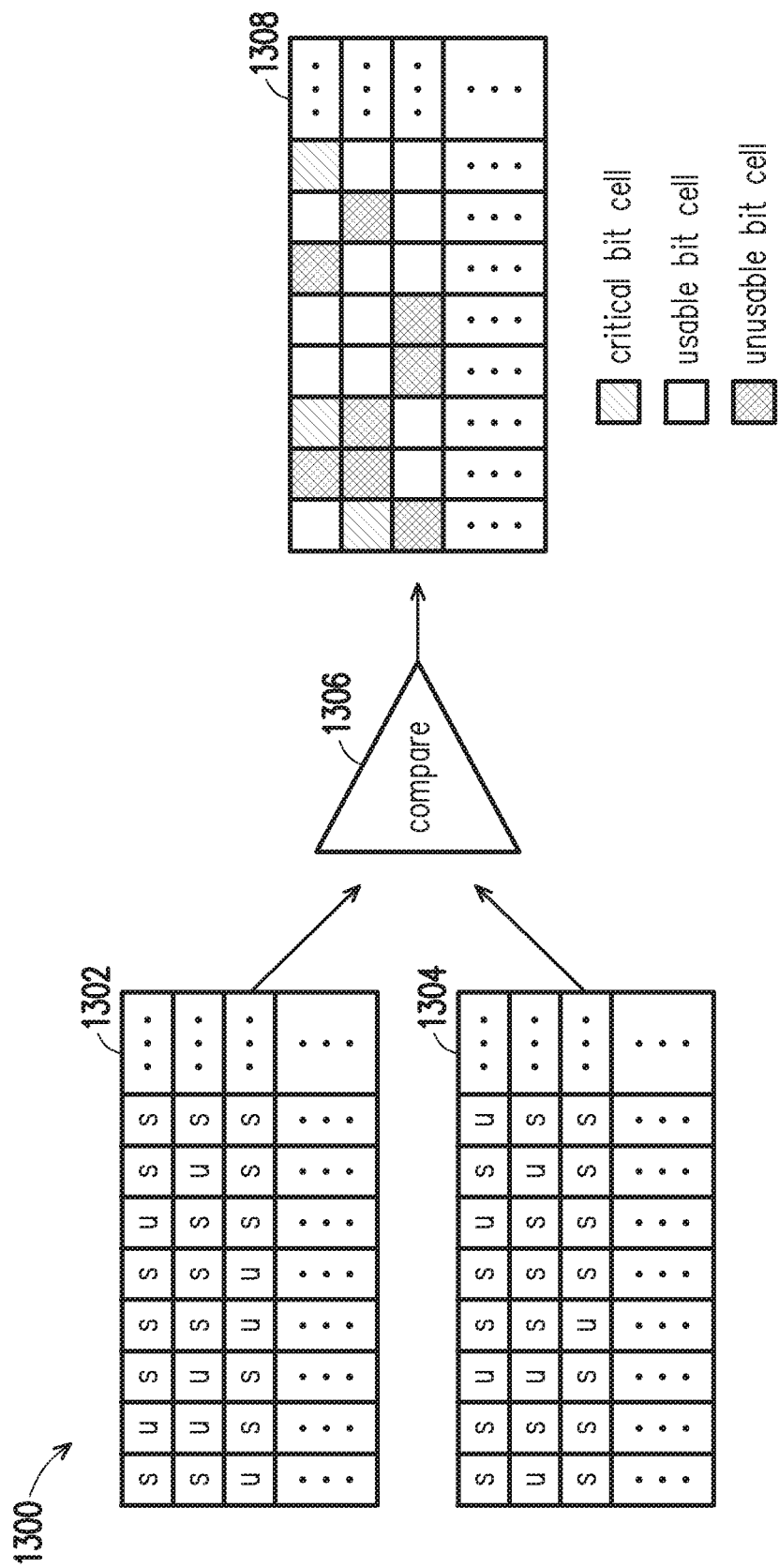
FIG. 13 illustrates an exemplary masking map and a test masking map comparison process to obtain a critical masking map, in accordance with some embodiments of the present disclosure.

FIG. 13 illustrates an exemplary masking map 1302 and a test masking map 1304 comparison process to obtain a critical masking map 1308, in accordance with some embodiments of the present disclosure. In the illustrated embodiments, the masking map 1302 comprises 24 bits and the test masking map 1304 comprises 24 bits. Although only 24 bits are shown, each of the masking map 1302 and the test masking map 1304 can comprise different numbers of bits which are determined by the number of bit cells in the PUF cell array 200 and are within the scope of this invention. The masking map 1302 comprises 8 unstable bit cells and 16 stable bit cells, and the test masking map 1304 comprises 7 unstable bit cells and 17 stable bit cells. After being compared in a comparing circuit 1306, the critical masking map 1308 comprising 24 bits can be obtained. In the illustrated embodiments, there are 13 usable bit cells, 8 unusable bit cells and 3 critical bit cells.

The method 1200 continues to operation 1208 in which the number critical bit cells from the operation 1206 is determined and compared to zero. If the number of critical bit cells in the critical masking map is determined to be not zero (e.g., 3 critical bit cells in the critical masking map), the method 1200 continues with operation 1204 by obtaining a second masking map at different load capacitance values. Then, the method 1200 continues with operation 1206 and 1208 to compare the second masking map with the test masking map in order to further determine the number of critical bit cells in a second critical masking map. This process continues until the number of critical bit cells in the critical masking map is determined to be zero. In some embodiments, when the number of critical cells is not able to be reduced to zero after a predefined time of testing or a certain numbers of iterations of different testing conditions, and further there is not enough usable cells (i.e., the number of useable cells is less than a desirable signature bits number), then the PUF generator under test is marked as FAILED. In some embodiments, the amount of time used to test or the number of iterations for testing is determined by a predetermined cost factor in order to balance the yield and cost.

The method 1200 continues to operation 1210 in which a number of usable bit cells are determined and compared to a predefined threshold value according to some embodiments. In some embodiments, if the number of usable bit cells in the critical masking map that does not contain any critical bit cell is greater than the predefined threshold value, the PUF generator 100 passes the quality-control tests and is determined as a qualified PUF generator. Similarly, if the number of usable bit cells in the critical masking map that does not contain any critical bit cell is less than the predefined threshold value, the PUF generator 100 fails the aforementioned quality-control tests and is determined as an un-qualified PUF generator. In some embodiments, a percentage (P) of a total number of bit cells that have logic 0 or 1 in the total number of usable bit cells in the critical masking map is also determined. In some other embodiments, a qualified PUF generator also provides a P value in a range of 45-55%.

Figure 14:
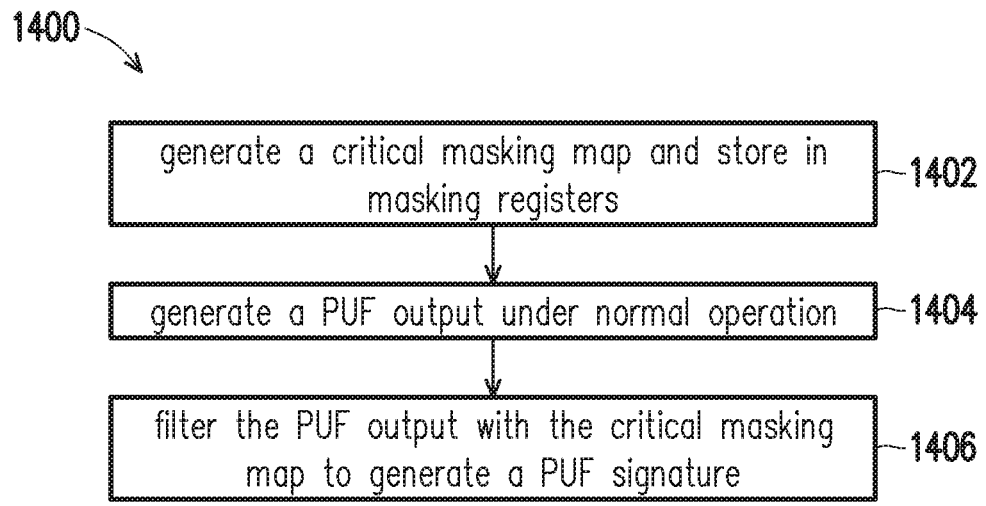
FIG. 14 illustrates a flow chart of a method to generate a PUF signature using a PUF generator, in accordance with some embodiments of present disclosure.

FIG. 14 illustrates a flow chart of a method 1400 to generate a PUF signature using a PUF generator 100, in accordance with some embodiments of present disclosure. In some embodiments, the operations of method 1400 are performed by the respective components illustrated in FIGS. 1-3, the methods 1000, 1100 and 1200 illustrated in FIGS. 10-12. For purposes of discussion, the following embodiment of the method 800 will be described in conjunction with FIGS. 1-3 and 10-12. The illustrated embodiment of the method 1400 is merely an example. Therefore, it should be understood that any of a variety of operations may be omitted, re-sequenced, and/or added while remaining within the scope of the present disclosure.

The method 1400 starts with operation 1402 in which a critical masking map is generated and stored in masking registers according to some embodiments. In some embodiments, the critical masking map is generated using methods 1000, 1100 and 1200 described above. In some embodiments, the critical masking map comprises no critical bit cells and a percentage of usable bit cells with logic 1 or 0 in the total number of usable bit cells of the critical masking map equals to 45-55%.

The method 1400 continues to operation 1404 in which a PUF output under normal operation conditions is generated. In some embodiments, the PUF output is generated using operations described in the method 1000. It should be noted that different methods to generate a PUF output under normal operation conditions can be used depending on the types of bit cells and are within the scope of this invention.

The method 1400 continues to operation 1406 in which a PUF output obtained under normal operation conditions is filtered by the critical masking map to generate a PUF signature. In some embodiments, bit cells that are marked with "1" is used to identify unstable bit cells.

Figure 15:
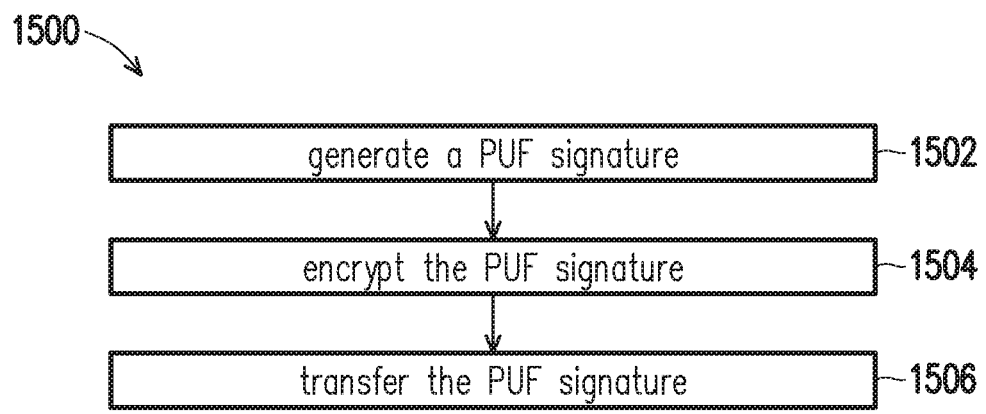
FIG. 15 illustrates a flow chart of a method to securely transfer a PUF signature to a server from a qualified PUF generator that passes a quality control tests, in accordance with some embodiments of present disclosure.

FIG. 15 illustrates a flow chart of a method 1500 to securely transfer a PUF signature to a server from a qualified PUF generator that passes a quality control tests, in accordance with some embodiments of present disclosure. In some embodiments, the operations of method 1500 are performed by the respective components illustrated in FIGS. 1-3, the methods 1000-1200, and 1400 illustrated in FIGS. 10-12 and 14. For purposes of discussion, the following embodiment of the method 800 will be described in conjunction with FIGS. 1-3, 10-12, and 14. The illustrated embodiment of the method 1500 is merely an example. Therefore, it should be understood that any of a variety of operations may be omitted, re-sequenced, and/or added while remaining within the scope of the present disclosure.

The method 1500 starts with operation 1502 in which a PUF signature is generated. In some embodiments, the PUF signature is generated using the method 1400 shown in FIG. 14 in combination with methods 1000-1200 shown in FIGS. 10-12.

The method 1500 continues with operation 1504 in which the PUF signature encrypted. In some embodiments, the PUF signature is transferred to a lock box 132 which also receives a public key for encryption of the PUF signature. In some embodiments, the lock box 132 comprises an asymmetric encrypter. In some embodiments, the lock box 132 contains one of the following asymmetric key encryption algorithm, such as for example RSA (Rivest-Shamir-Adleman), DSA (Digital Signature Algorithm), ECC (Elliptic Curve Cryptography), ElGamal algorithms, etc. In some embodiments, the lock box 132 comprises a processor and a control logical circuit (both are not shown in FIG. 1) in order to encrypt the PUF signature to be transmitted to a server in response to a request received from the server at the controller 112.

The method 1500 continues to operation 1106 in which the encrypted PUF signature is transferred to the server through a dedicated I/O port 136 for external uses. In some embodiments, the encrypted PUF signature may also comprises helper data which is used to recover noisy PUF information. In some embodiments, the server also receives and decrypts the encrypted PUF signature using an asymmetric encrypter which contains a private key. In some embodiments, only authorized servers with matching private key can perform the decryption and obtain the PUF signature.

In one embodiment, a physical unclonable function (PUF) generator, includes: a PUF cell array comprising a plurality of bit cells configured in at least one column and at least one row, wherein the plurality of bit cells each provides two voltage transient behaviors on two corresponding bit lines of the at least one column; and at least two load control circuits coupled to the two bit lines of the at least one corresponding column, wherein the at least two load control circuits are each configured to provide at least one discharge pathway to at least one of the two corresponding bit lines, wherein the at least one discharge pathway is configured to change at least one of the two voltage transient behaviors so as to determine stability of each of the plurality of bit cells of the PUF cell array.

In another embodiment, a physical unclonable function (PUF) generator, includes: a PUF cell array comprising a plurality of bit cells configured in at least one column and at least one row, wherein the plurality of bit cells each provides two voltage transient behaviors on two corresponding bit lines of the at least one column; at least two load control circuits coupled to the two bit lines of the at least one corresponding column, wherein the at least two load control circuits are each configured to provide at least one discharge pathway to at least one of the two corresponding bit lines, wherein the at least one discharge pathway is configured to change at least one of the two voltage transient behaviors so as to determine stability of each of the plurality of bit cells of the PUF cell array; and at least two pre-charge units coupled to the two bit lines of the at least one corresponding column, wherein the at least two pre-charge units each comprises at least one transistor coupled between one of the two corresponding bit lines and a preconfigured voltage, wherein the preconfigured voltage is one of the following: a VDD and a GND; a masking circuit configured to determine a first map and a second map, wherein the first map is determined using the at least two load control circuits and the second map is determined under a first set of operation conditions, wherein the first and second maps each comprises at least one stable bit cells and at least one unstable bit cell; and a Built-In Self-Test (BIST) engine configured to determine a first number of first bit cells and a second number of second bit cells, wherein each of the first bit cells is stable in the first map and unstable in the second map, and each of the second bit cells is stable in the first map and stable in the second map.

Yet, in another embodiment, a testing method for physical unclonable function (PUF) generator, includes: generating a first map of the PUF generator using at least two load control circuits and a masking circuit, wherein the PUF generator comprises a plurality of bit cells configured in at least one column and at least one row; generating a second map of the PUF generator under a set of operation conditions using the masking circuit, wherein the first map and the second map each comprises at least one stable bit cells and at least one unstable bit cell; determining a first number of first bit cells, wherein the first bit cells each is stable in the first map and unstable in the second map using a Built-in Self-Test (BIST) engine; if the first number of second bit cells is determined to be zero, determining a second number of second bit cells using the BIST engine, wherein the second bit cells each is stable in the first map and stable in the second map; and if the second number of the second bit cells are greater than a second preconfigured number, the PUF generator is determined as a qualified PUF generator.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physical unclonable function (PUF) generator, comprising:
    a PUF cell array comprising a plurality of bit cells configured in at least one column and at least one row, wherein the plurality of bit cells each provides two voltage transient behaviors on two corresponding bit lines of the at least one column;
    at least two load control circuits coupled to the two bit lines of the at least one corresponding column, wherein the at least two load control circuits are each configured to provide at least one discharge pathway to at least one of the two corresponding bit lines, wherein the at least one discharge pathway is configured to change at least one of the two voltage transient behaviors so as to determine stability of each of the plurality of bit cells of the PUF cell array;
    a masking circuit configured to determine a first map and a second map, wherein the first map is determined using the at least two load control circuits and the second map is determined under a first set of operation conditions, wherein the first and second maps each comprises at least one stable bit cell and at least one unstable bit cell; and
    a plurality of shift registers configured to store a first plurality (M) of bit cells determined to be stable and configured to output a second plurality (N) of bit cells for generating a PUF signature, wherein M and N are positive integers and N is less than M.

2. The PUF generator of claim 1, wherein each of the plurality of bit cells comprises one of the following: a pre-charge bit cell and a pre-discharge bit cell.

3. The PUF generator of claim 1, wherein the plurality of bit cells each comprises at least two transistors, wherein the at least two transistors are coupled in series and between the two bit lines of the at least one corresponding column.

4. The PUF generator of claim 1, wherein the at least two load control circuits each comprises at least one transistor and at least one load capacitor.

5. The PUF generator of claim 1, further comprising:
    at least two pre-charge units coupled to the two bit lines of the at least one corresponding column, wherein the at least two pre-charge units each comprises at least one transistor coupled between one of the two corresponding bit lines and a preconfigured voltage, wherein the preconfigured voltage is one of the following: a voltage drain-drain (VDD) and a ground voltage (GND).

6. The PUF generator of claim 1, further comprising:
a controller coupled to the PUF cell array and the at least two load control circuits, wherein the controller is configured to enable at least one of the at least two load control circuits so as to provide the at least one discharge pathway to the at least one of the two corresponding bit lines;
a Built-In Self-Test (BIST) engine configured to determine a first number of first bit cells and a second number of second bit cells, wherein each of the first bit cells is stable in the first map and unstable in the second map and each of the second bit cells is stable in the first map and stable in the second map; and
a lock box configured to encrypt the PUF signature before transmitting to a server.

7. The PUF generator of claim 6, wherein the masking circuit further comprises:
storage registers configured to store a first PUF output from the PUF cell array;
a comparing circuit configured to compare a second PUF output with the first PUF output in the storage registers to identify at least one third bit cell in the first and second maps, wherein logical states of the at least one third bit cell in the first and the second PUF outputs are different;
masking registers configured to store an address of the at least one third bit cell; and
a masking unit to exclude the logical state of the at least one third bit cell, wherein
the plurality of shift registers are configured to select the first N of the second bit cells to generate the PUF signature.

8. The PUF generator of claim 6, wherein the set of operation conditions comprises at least one of the following: at least one operation temperature and at least one operational voltage level.

9. A physical unclonable function (PUF) generator, comprising:
a PUF cell array comprising a plurality of bit cells configured in at least one column and at least one row, wherein the plurality of bit cells each provides two voltage transient behaviors on two corresponding bit lines of the at least one column;
at least two load control circuits coupled to the two bit lines of the at least one corresponding column, wherein the at least two load central circuits are each configured to provide at least one discharge pathway to at least one of the two corresponding bit lines, wherein the at least one discharge pathway is configured to change at least one of the two voltage transient behaviors so as to determine stability of each of the plurality of bit cells of the PUF cell array;
at least two pre-charge units coupled to the two bit lines of the at least one corresponding column, Wherein the at least two pre-charge units each comprises at least one transistor coupled between one of the two corresponding bit lines and a preconfigured voltage, Wherein the preconfigured voltage is one of the following: a voltage drain-drain (VDD) and a ground voltage (GND);
a masking circuit configured to determine a first map and a second map, wherein the first map is determined using the at least two load control circuits and the second map is determined under a first set of operation conditions, wherein the first and second maps each comprises at least one stable bit cell and at least one unstable bit cell, a Built-In-Self-Test (BIST) engine configured to determine a first number of first bit cells and a second number of second bit cells, wherein each of the first bit cells is stable in the first map and unstable in the second map, and each of the second bit cells is stable in the first map and stable in the second map; and
a plurality of shift registers configured to store a first plurality (M) of bit cells determined to be stable and configured to output a second plurality (N) of bit cells for generating a PUF signature, wherein M and N are positive integers and N is less than M.

10. The PUF generator of claim 9, wherein each of the plurality of bit cells comprises one of the following: a pre-charge bit cell and a pre-discharge bit cell.

11. The PUF generator of claim 9, wherein the plurality of bit cells each comprises at least two transistors, wherein the at least two transistors are coupled in series and between the two bit lines of the at least one corresponding column.

12. The PUF generator of claim 9, wherein the at least two load control circuits each comprises at least one transistor and at least one load capacitor.

13. The PUF generator of claim 9, further comprising:
a controller coupled to the PUF cell array and the at least two load control circuits, wherein the controller is configured to enable at least one of the at least two load control circuits so as to provide the at least one discharge pathway to the at least one of the two corresponding bit lines.

14. The PUF generator of claim 9, wherein the first set of operation conditions comprises at least one of the following: at least one operation temperature and at least one operational voltage level.

15. The PUF generator of claim 9, wherein the masking circuit further comprises:
storage registers configured to store a first PUF output from the PUF cell array;
a comparing circuit configured to compare a second PUF output with the first PUF output in the storage registers to identify at least one third bit cell in the first and second maps, wherein logical states of the at least one third bit cell in the first and the second PUF outputs are different;
masking registers configured to store an address of the at least one third bit cell; and
a masking unit to exclude the logical state of the at least one third bit cell, wherein the plurality of shift registers are configured to select the second bit cells to generate the PUF signature.

16. The PUF generator of claim 13, wherein the controller is further configured to
write preconfigured logical states to the plurality of bit cells in the PUF cell array through the at least two pre-charge units;
determine the first number of the first bit cells;
determine the second number of the second bit cells, if the first number of the first bit cells is determined to be zero;
re-generate the second map under a second set of operation conditions until the first number of the first bit cells is determined to be zero; and
determine a qualification of the PUF generator based on a comparison of the second number of the second bit cells and a second preconfigured number.

17. The PUF generator of claim 9, further comprising a lock box configured to encrypt the PUF signature before transmitting to a server.

18. A testing method for physical unclonable function (PUF) generator, comprising:
  generating a first map of the PUF generator using at least two load control circuits and a masking circuit, wherein the PUF generator comprises a plurality of bit cells configured in at least one column and at least one row;
  generating a second map of the PUF generator under a set of operation conditions using the masking circuit, wherein the first map and the second map each comprises at least one stable bit cell and at least one unstable bit cell;
  determining a first number of first bit cells and a second number of second bit cells using a Built-in Self-Test (BIST) engine, wherein each of the first bit cells is stable in the first map and unstable in the second map, and each of the second bit cells is stable in the first map and stable in the second map;
  if the first number of second bit cells is determined to be zero, determining a second number of second bit cells using the BIST engine, wherein the second bit cells each is stable in the first map and stable in the second map;
  if the second number of the second bit cells are greater than a second preconfigured number, the PUF generator is determined as a qualified PUF generator;
  storing the second number of second bit cells in a plurality of shift registers; and
  outputting a third number of the second bit cells from the plurality of shift registers for generating a PUF signature, wherein the second and third numbers are integers and the third number is smaller than the second number.

19. The method of claim 18, wherein the at least two load control circuits each comprises at least one transistor and at least one load capacitor, wherein the at least two load control circuits are each configured to provide at least one discharge pathway to at least one of two corresponding bit lines, wherein the at least one discharge pathway is configured to change at least one of two voltage transient behaviors so as to determine stability of each of the plurality of bit cells of the PUF cell array.

20. The method of claim 18, further comprising:
  before the generating, writing preconfigured logical states to the plurality of bit cells in the PUF cell array using at least two pre-charge units, wherein the at least two pre-charged units are coupled to the two bit lines of the at least one corresponding column, wherein the at least two pre-charge units each comprises at least one transistor coupled between one of the two corresponding bit lines and a preconfigured voltage, wherein the preconfigured voltage is one of the following: a voltage drain-drain (VDD) and a ground voltage (GND).

* * * * *